Nov. 25, 1930.    R. J. BURROWS    1,782,865
AUTOMOBILE LIFT TRUCK
Filed May 1, 1922    12 Sheets-Sheet 1
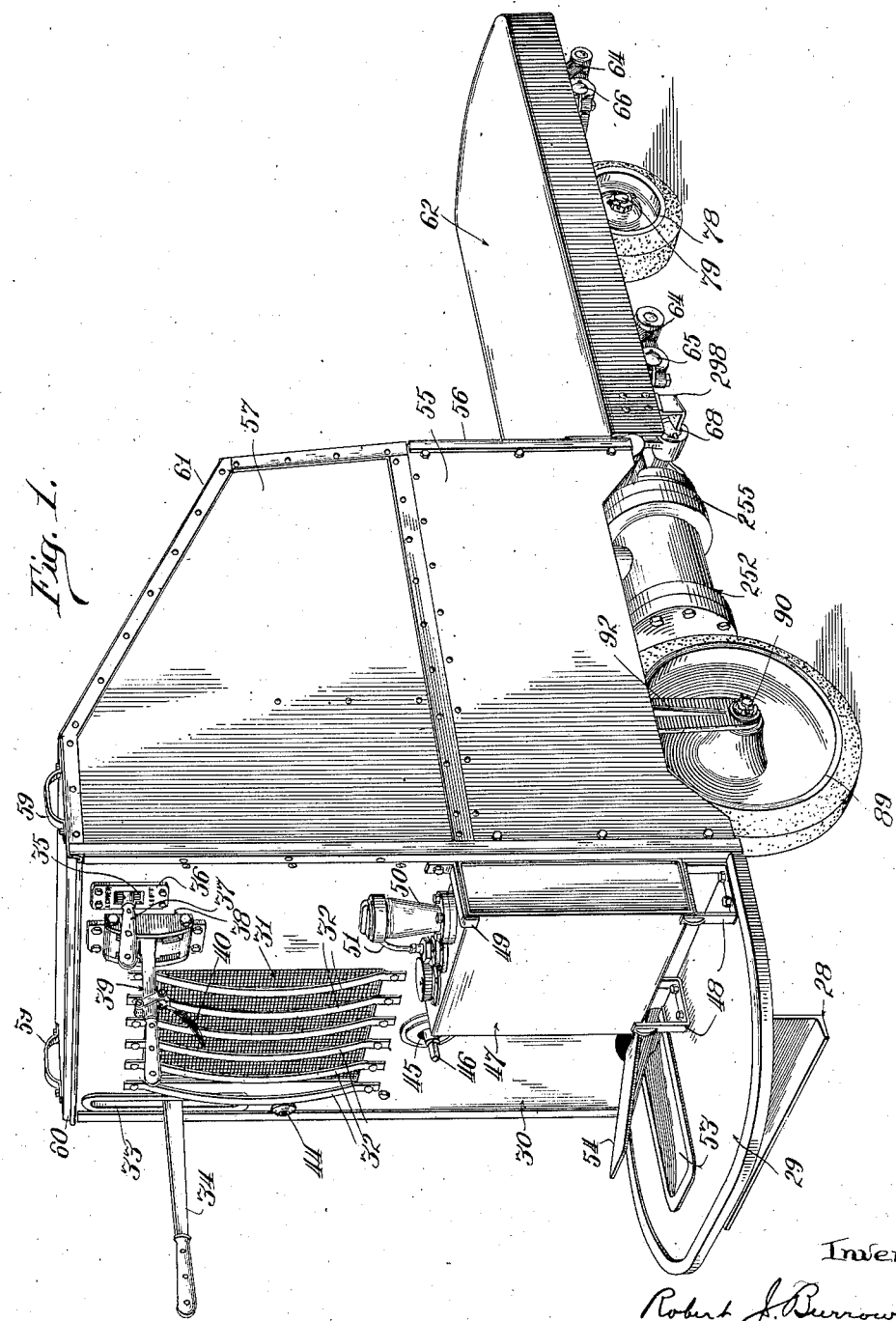

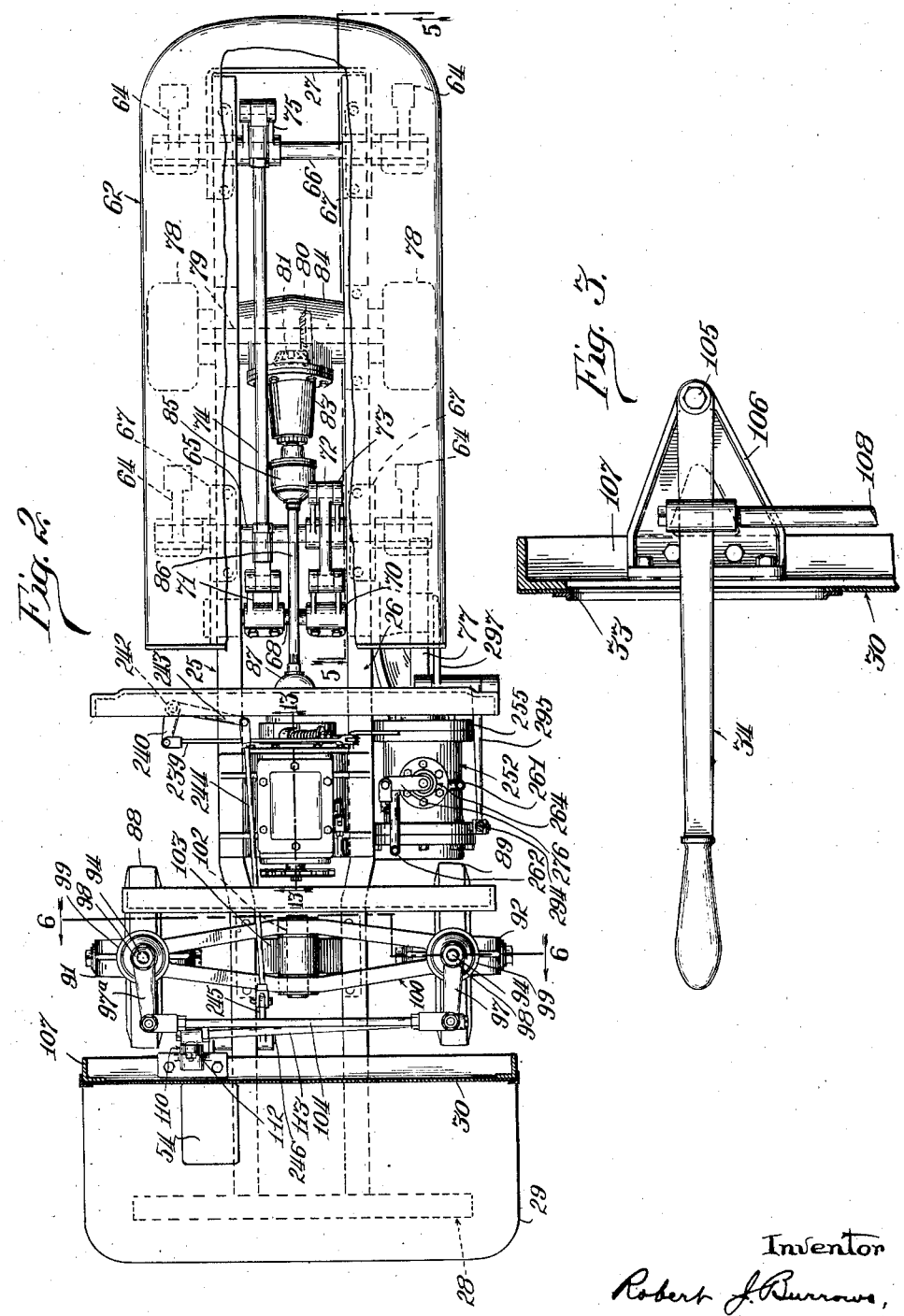

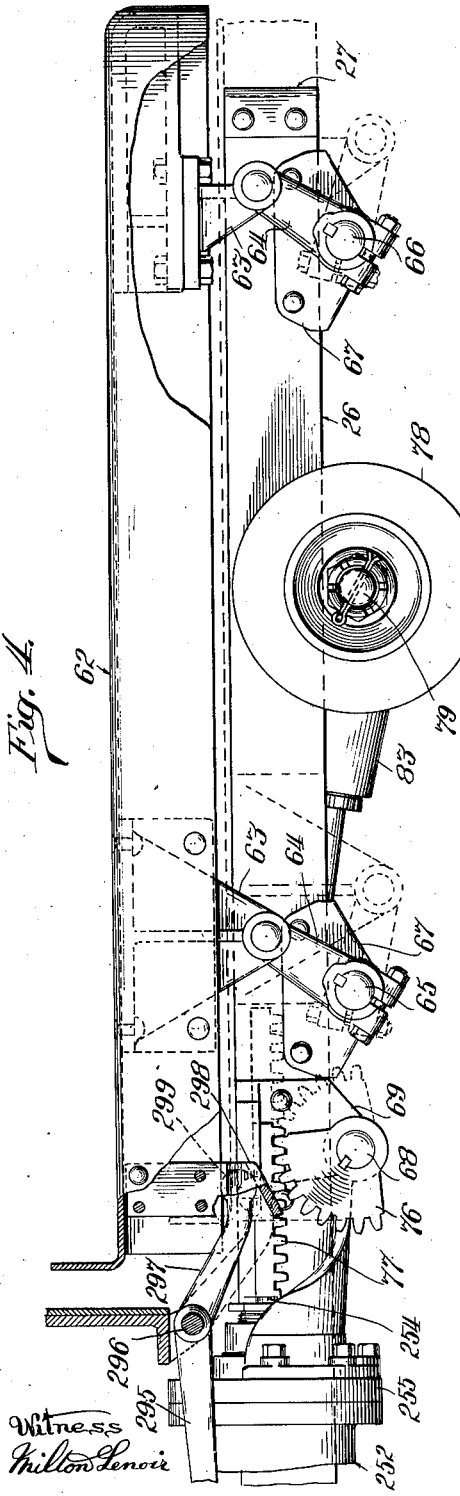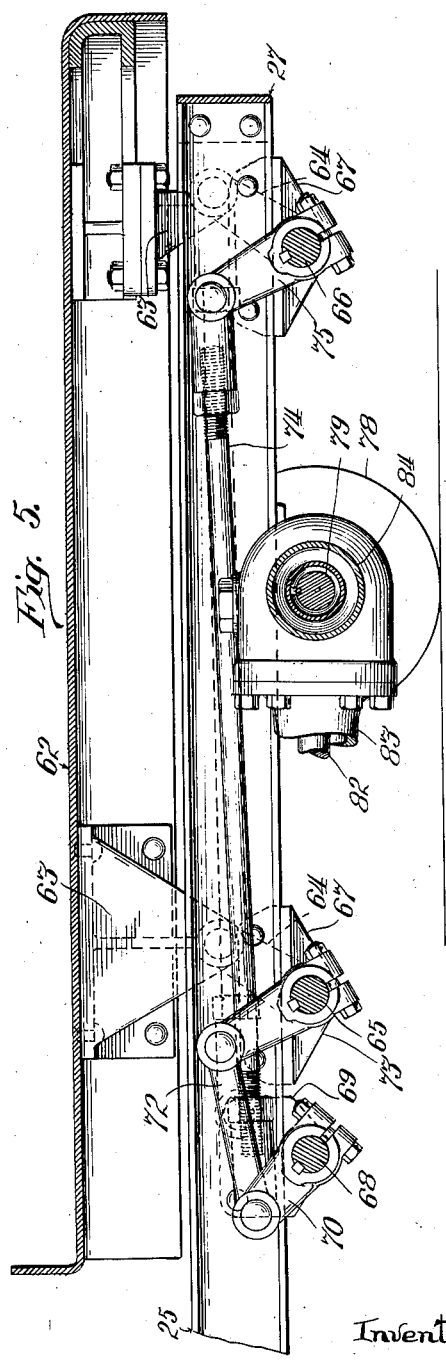

Nov. 25, 1930.   R. J. BURROWS   1,782,865
AUTOMOBILE LIFT TRUCK
Filed May 1, 1922   12 Sheets-Sheet 4
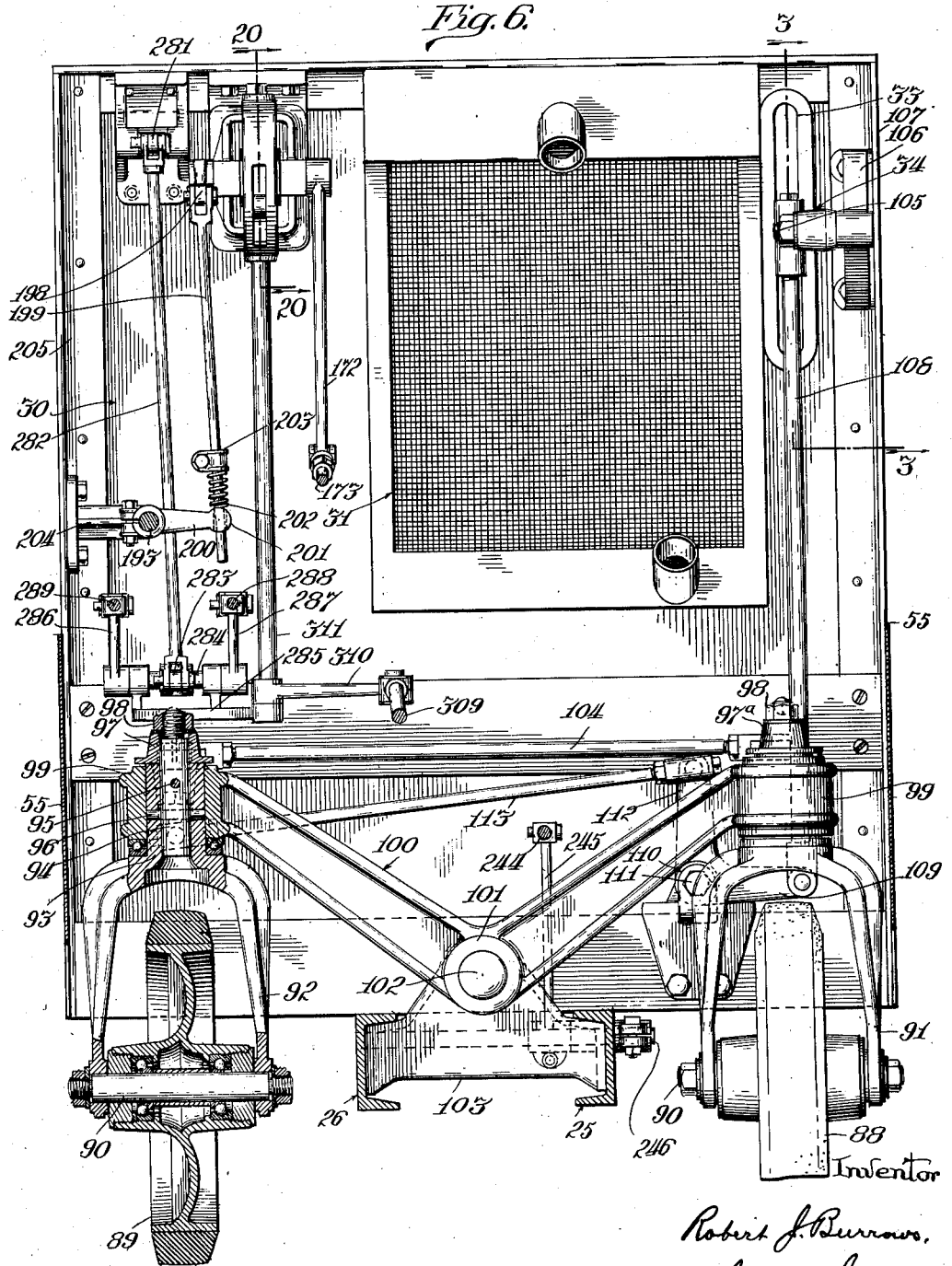

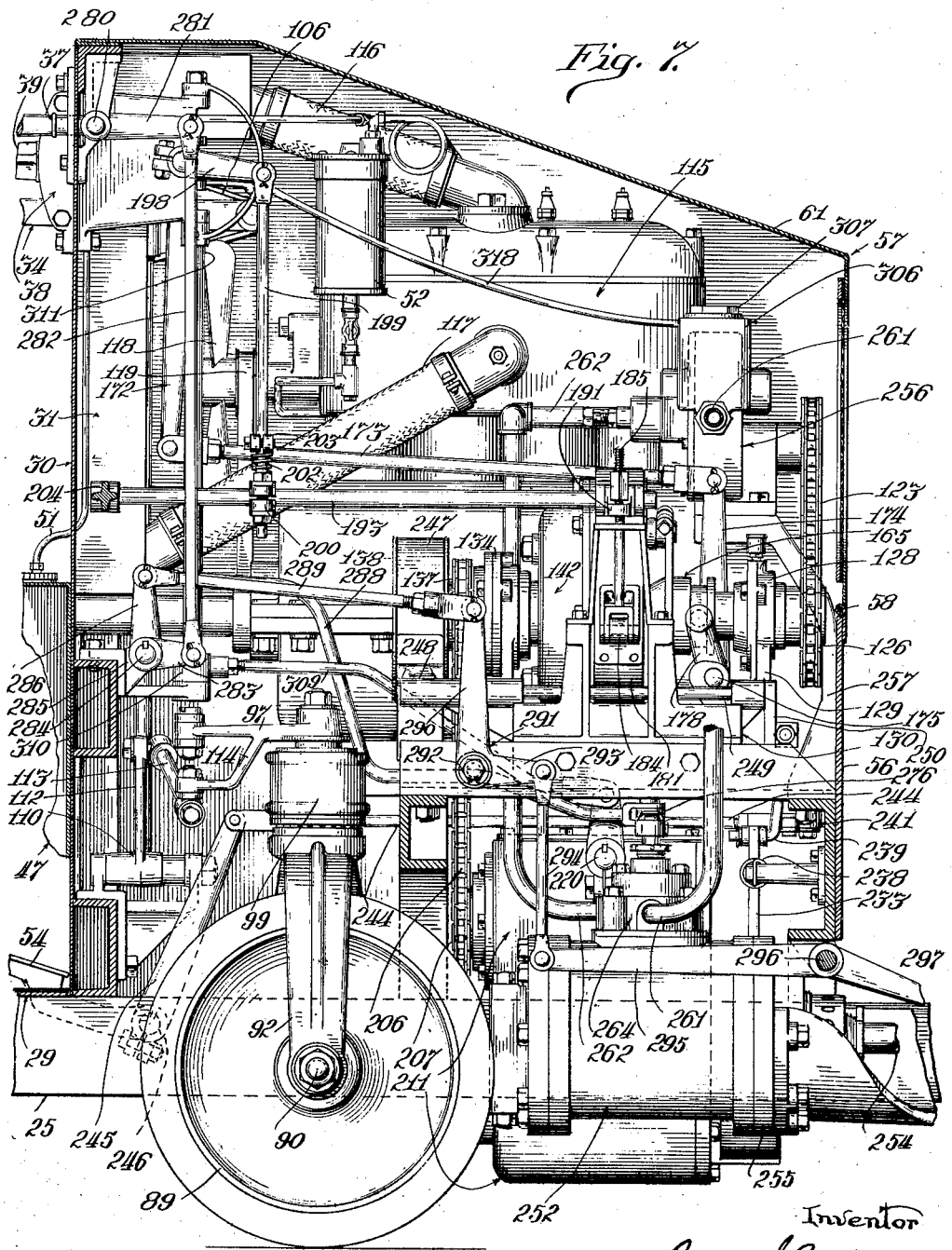

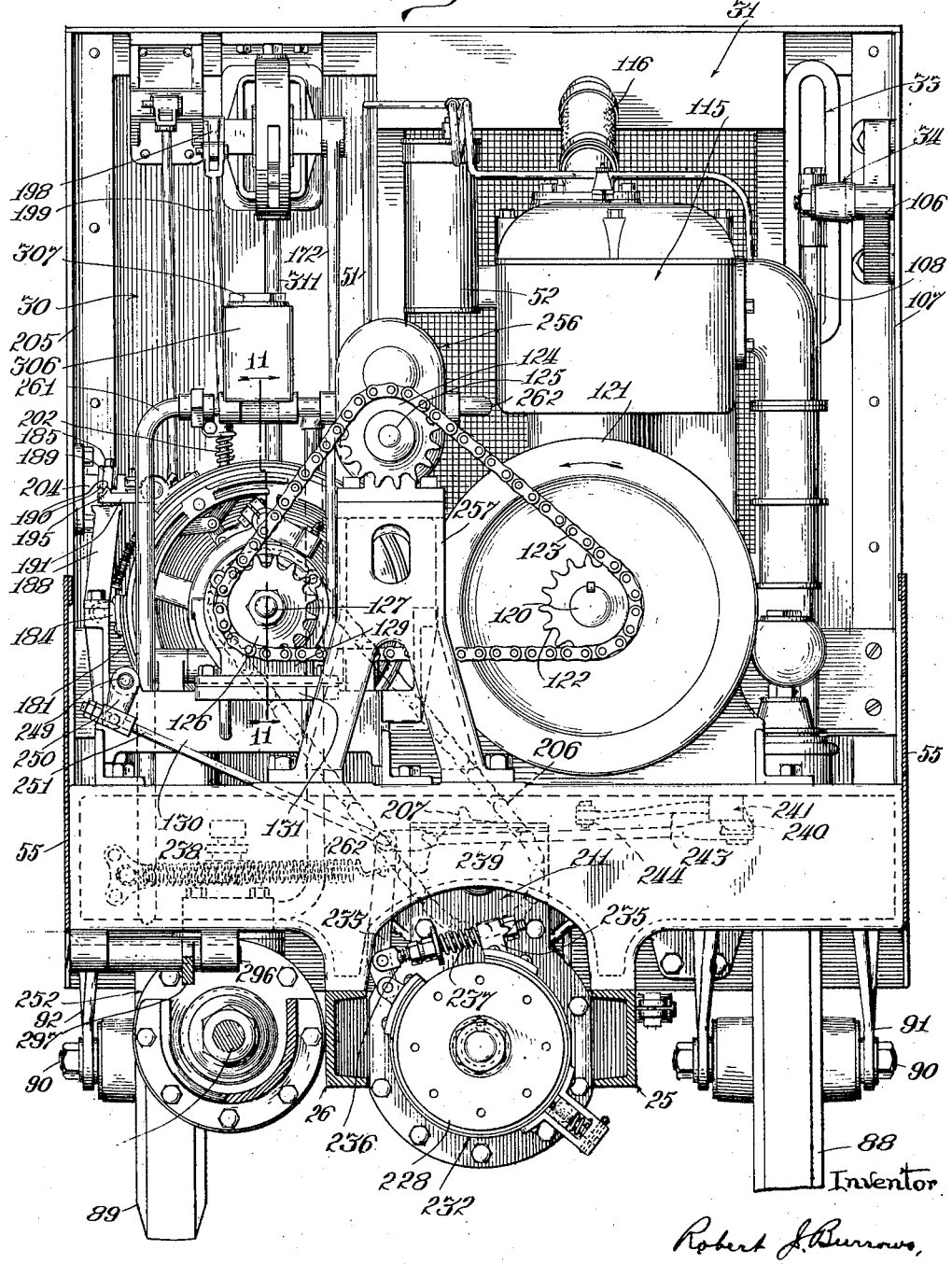

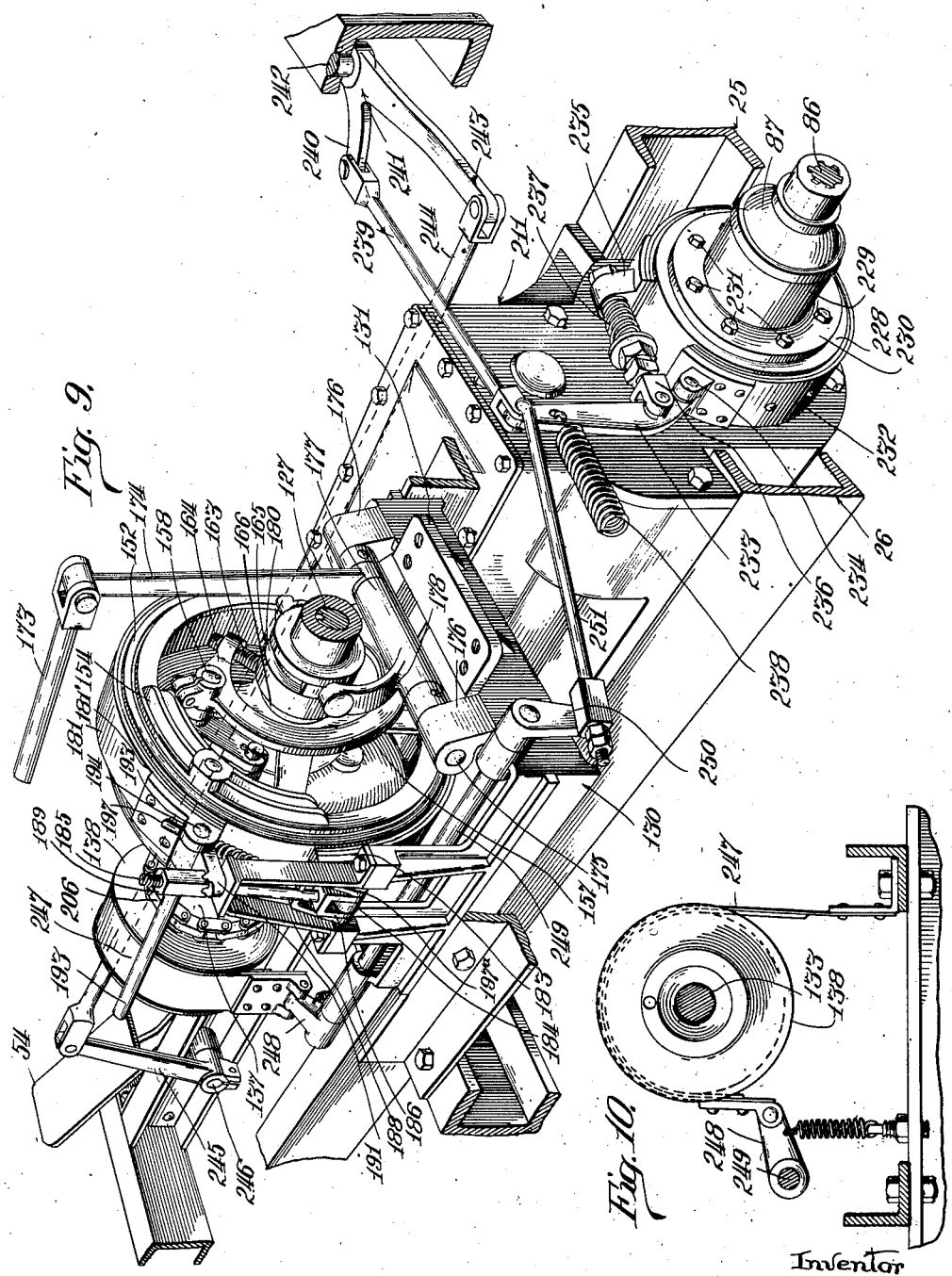

Nov. 25, 1930.    R. J. BURROWS    1,782,865
AUTOMOBILE LIFT TRUCK
Filed May 1, 1922    12 Sheets-Sheet 8
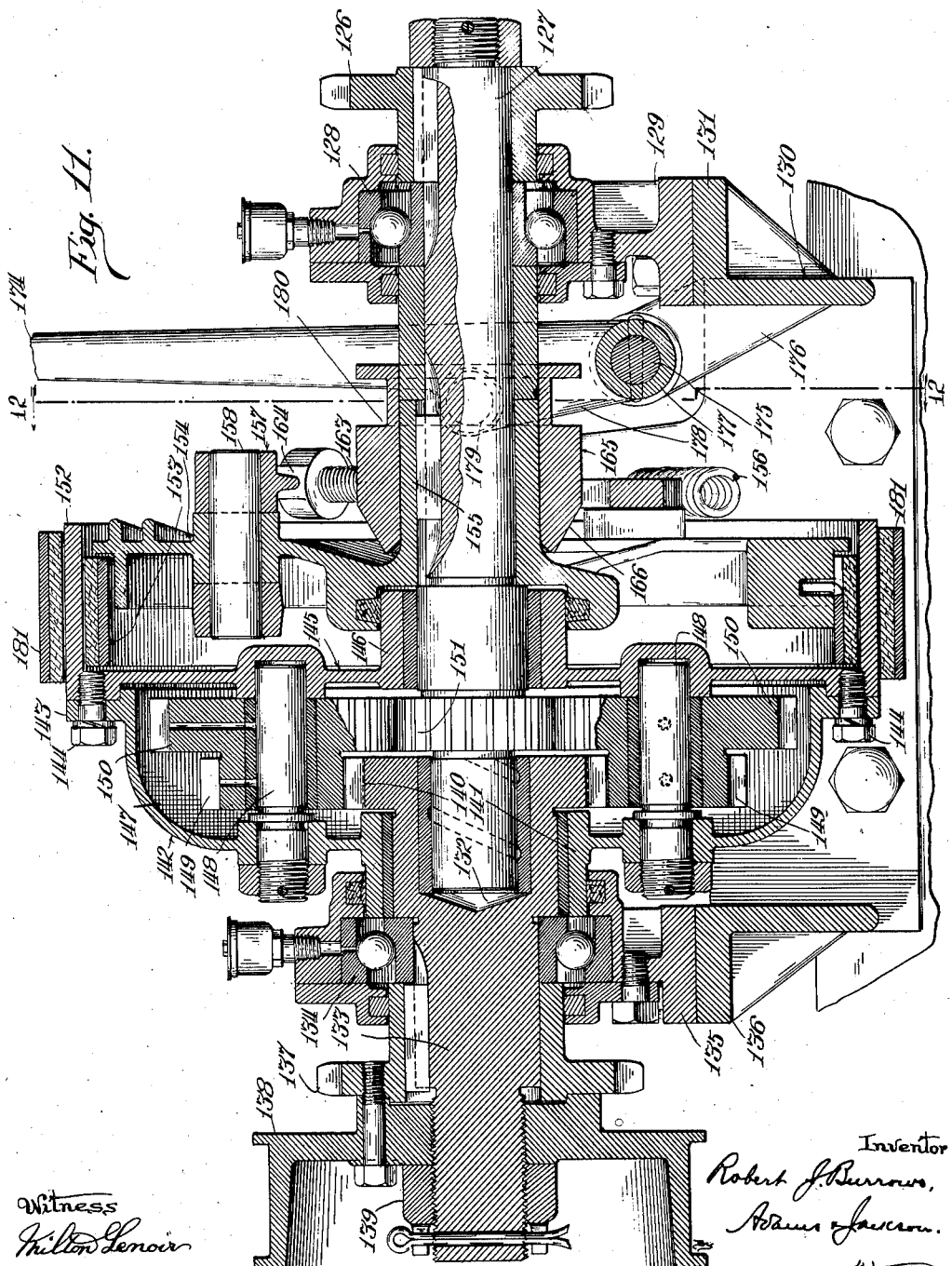

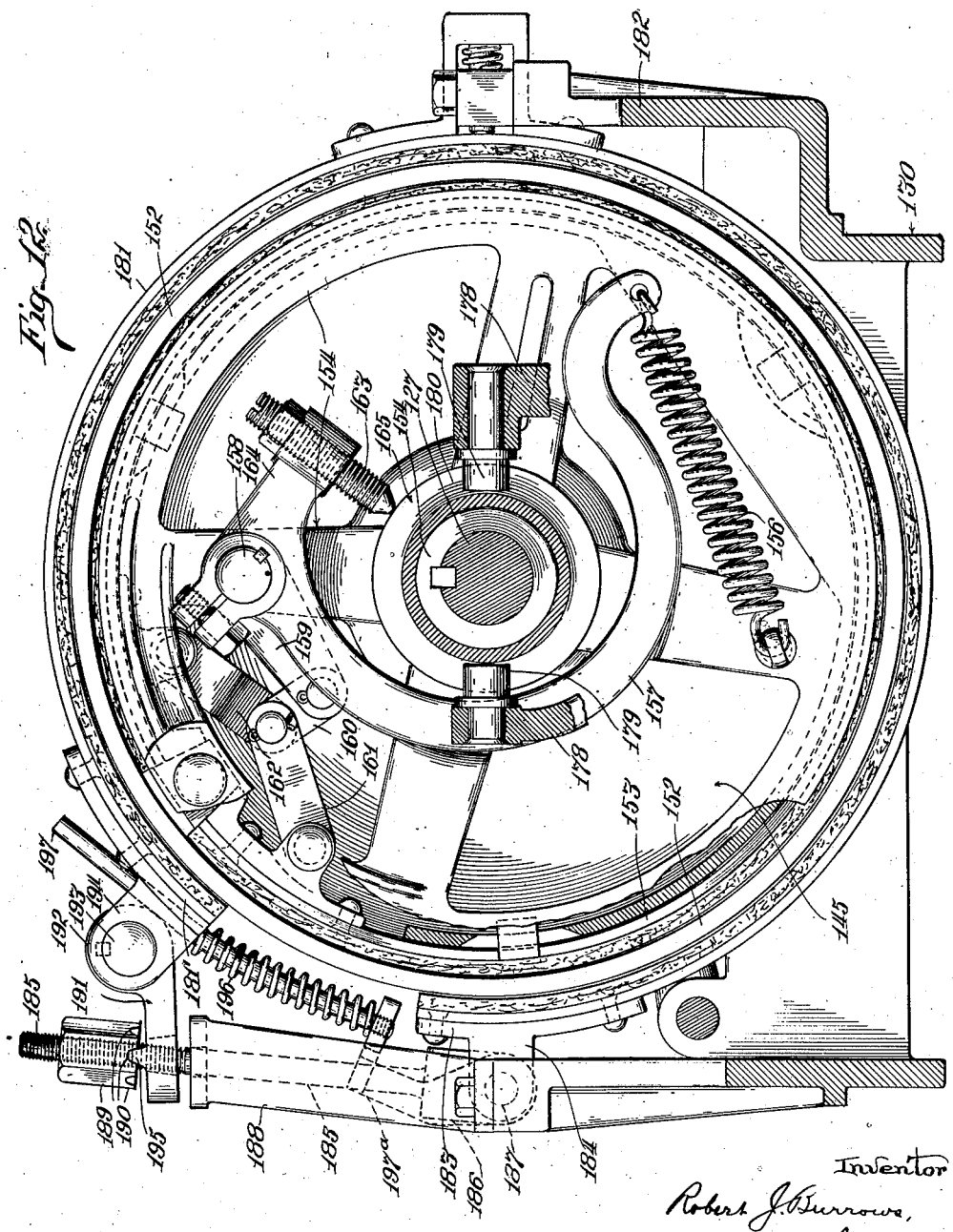

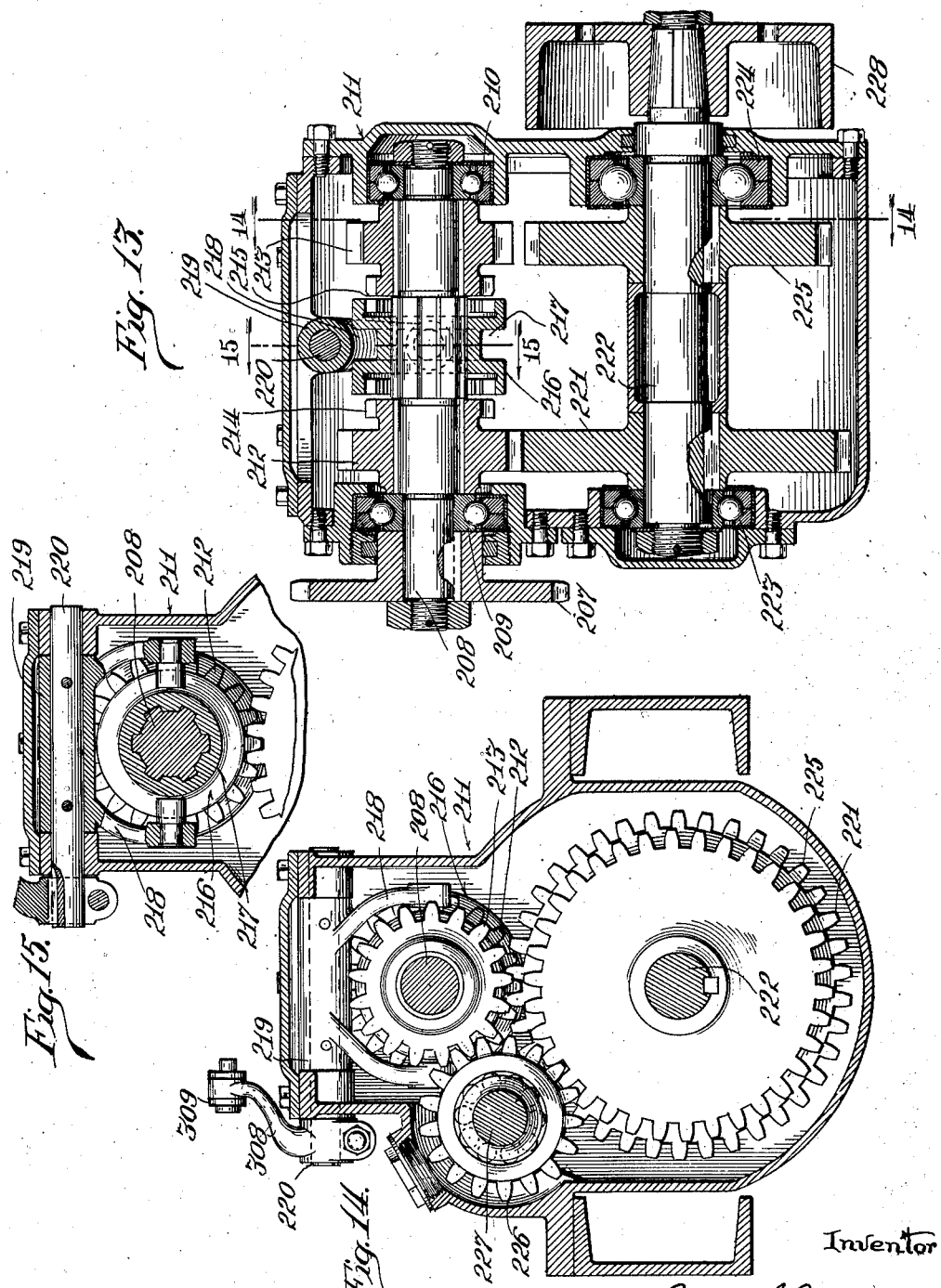

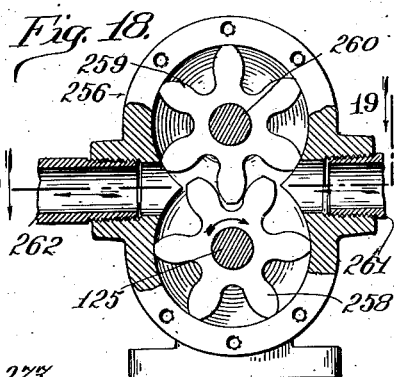
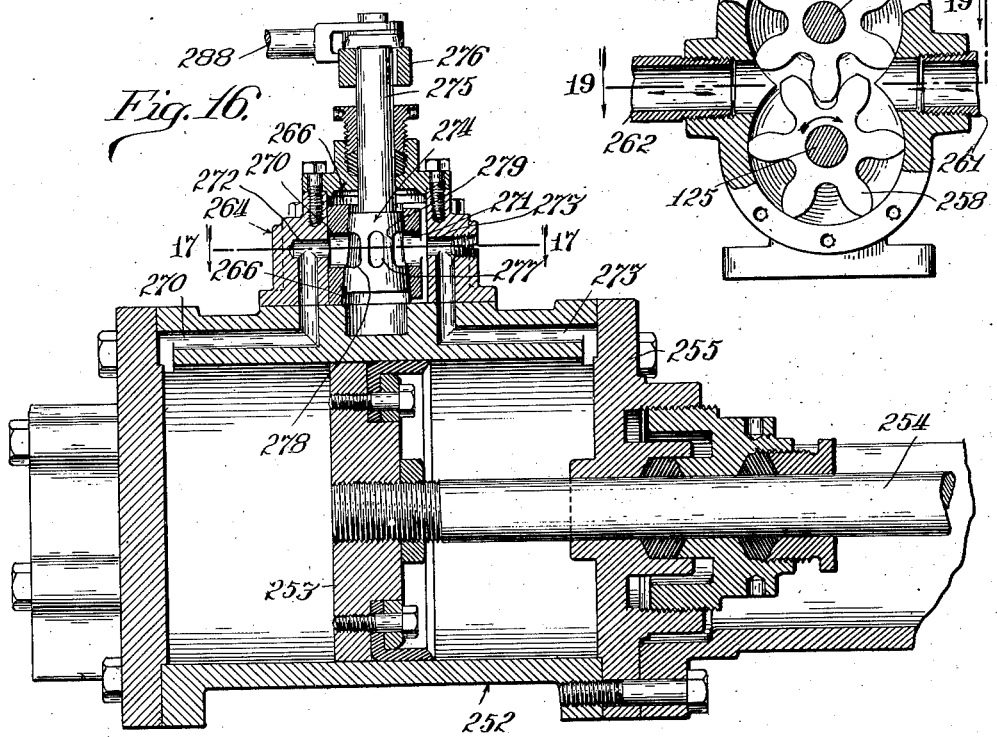
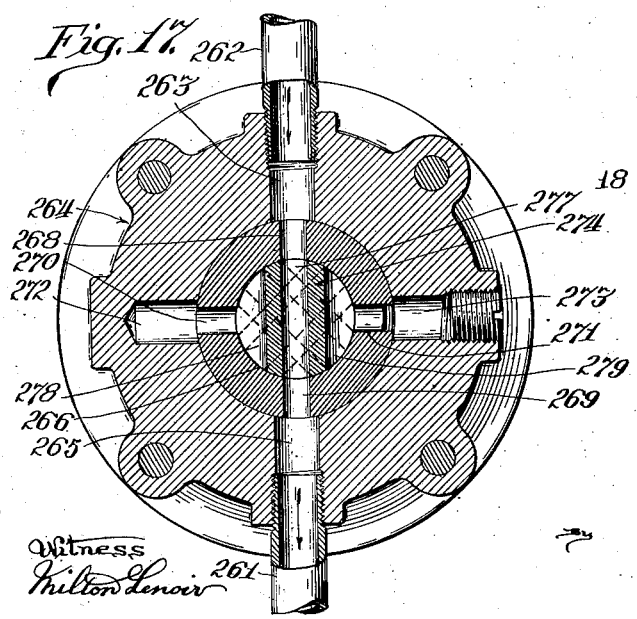
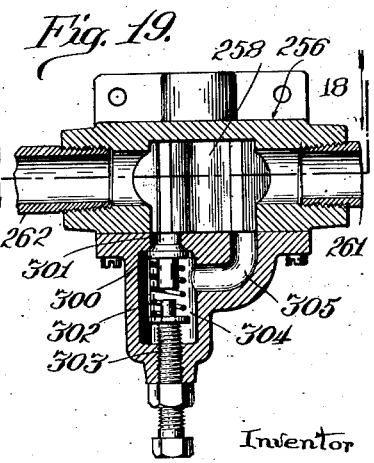

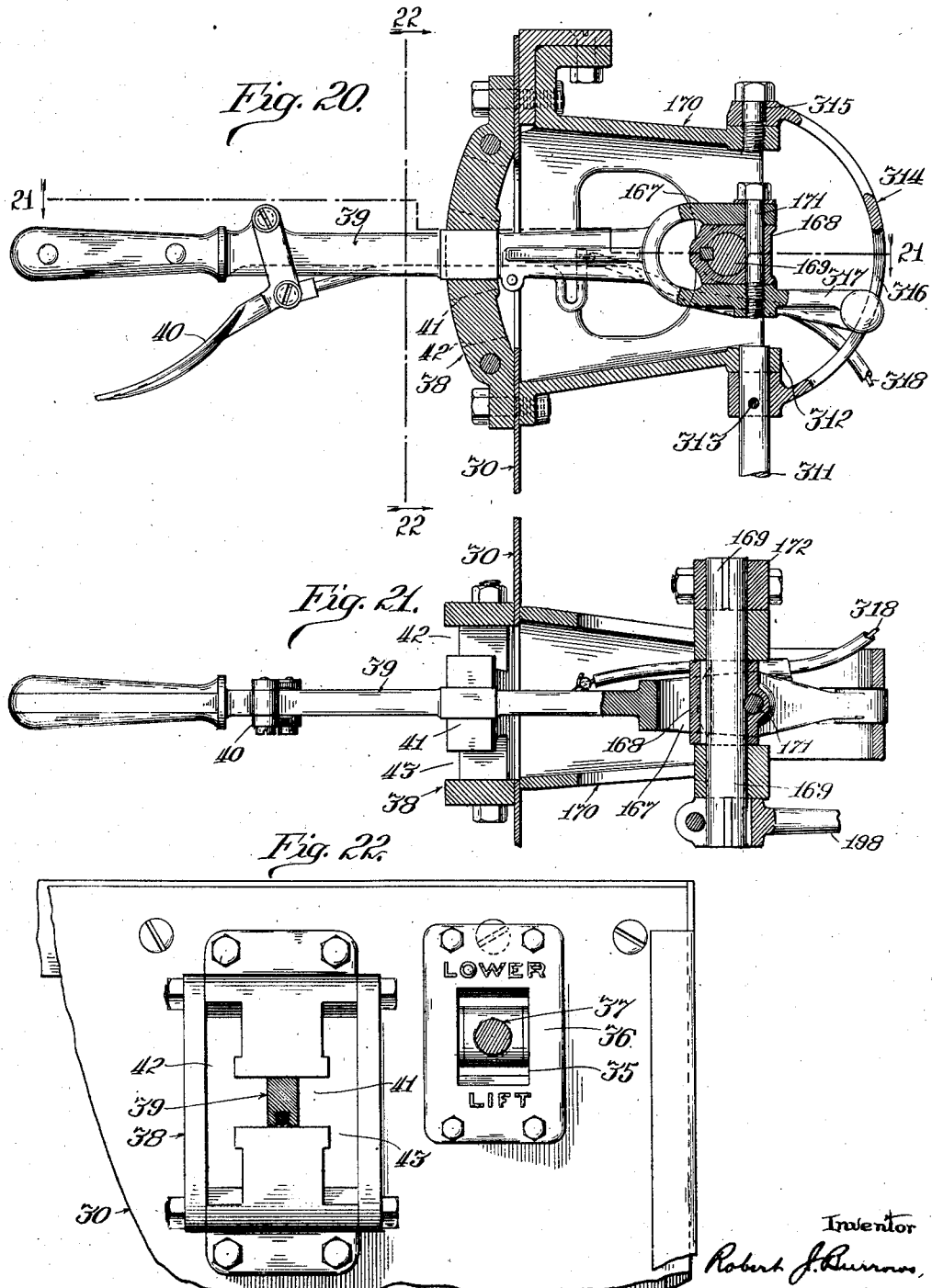

Patented Nov. 25, 1930

1,782,865

UNITED STATES PATENT OFFICE

ROBERT J. BURROWS, OF BUCHANAN, MICHIGAN, ASSIGNOR TO CLARK TRUCTRACTOR COMPANY, OF BUCHANAN, MICHIGAN, A CORPORATION OF MICHIGAN

AUTOMOBILE LIFT TRUCK

Application filed May 1, 1922. Serial No. 557,646.

My invention relates to lift trucks, or trucks comprising a wheeled carriage on which is supported a rising and falling lifting frame or platform, which when in its lowered position is adapted to be shoved under a frame on which the load to be transported is placed so that by then elevating the platform such frame with the load carried thereby may be lifted from the floor and transported by the truck to the place where it is to be deposited. By then lowering the platform of the truck the frame with its load may be replaced on the floor and the truck withdrawn for use elsewhere. Hand operated trucks of this description are well known and in general use, but they are not adapted for handling very heavy loads and do not supply the existing demand for a lift truck which is not only propelled by power, but in which the raising and lowering of the platform is also effected by power. Several attempts have been made to supply this demand by providing an electrically propelled truck operated by storage batteries, which also supply current to operate the lifting platform, but such trucks have not been very successful for several reasons. Not only is the initial cost of such trucks excessive, since at least two sets of batteries must be provided for each truck so that one set can be charged while the other is in use, but the loss through deterioration of the batteries is considerable, the weight of the truck is objectionable, and as the efficiency of the batteries runs down as they become discharged there is a loss of power and efficiency toward the end of the period during which the batteries are in use. In electrically operated trucks, also, there is not sufficient flexibility as regards speed. For these and other reasons which it is not necessary to point out, such trucks have not given satisfaction. Therefore, the principal purpose of my present invention is to provide an automobile lift truck in which not only power to propel the truck but also that used for raising and lowering the lifting platform will be supplied by an internal combustion motor such as are commonly used in automobile vehicles. In addition to this main object, my invention also contemplates the provision of an improved truck in which the operator will always have a clear view of the lifting platform, as well as of his surroundings, so that he can operate the truck efficiently and without danger; in which the several controls by which the truck is guided, its speed regulated and the operation of the lifting platform effected will be conveniently accessible; in which the danger of incorrect operation of the truck will be reduced to the minimum; in which the movement of the lifting platform will be subject to instant control by the operator so that he may stop or reverse the movement of the platform at any time, regardless of the extent to which it may have been lifted or lowered; in which the lifting platform will adapt itself to any inequalities in the floor over which the truck is operated, so that the lifting strains will not tend to distort or cause binding of the lifting mechanism; in which the requisite pressure for operating the lifting mechanism will always be instantly available; in which the danger of damage to the lifting mechanism, by reason of excessive pressure, will be eliminated, and which will realize various other advantages which will be pointed out in the course of the description of the embodiment of my invention as illustrated in the accompanying drawings in which I have shown a truck embodying all the above features. What I regard as new will be set forth in the claims.

In the accompanying drawings,—

Fig. 1 is a perspective view of my improved truck as a whole;

Fig. 2 is a plan view, some parts being broken away, showing the main frame with some of the parts carried thereby and a portion of the lifting frame;

Fig. 3 is a detail, being a partial vertical section on line 3—3 of Fig. 6 illustrating the steering lever;

Fig. 4 is a side elevation of the rear portion of the truck showing the main frame and lifting platform, some parts being broken away;

Fig. 5 is a partial longitudinal section on line 5—5 of Fig. 2, showing the main frame and lifting platform with the devices by which the platform is supported;

Fig. 6 is a vertical cross-section on line

6—6 of Fig. 2, showing a rear view of what may be termed the dashboard, and the radiator, and also the front or steering wheels, together with the devices by which they are connected with the main frame and with the steering lever;

Fig. 7 is a side view of the power plant, the hood and some portions of the frame of the machine being shown in section;

Fig. 8 is a rear view of the power plant, or in other words is a view of the parts shown in Fig. 7 looking to the left, the hinged portion of the hood being removed;

Fig. 9 is a perspective view illustrating principally the transmission mechanism and parts associated therewith;

Fig. 10 is a detail showing the retarding brake mechanism by which the speed of the transmission mechanism is retarded to facilitate gear shifting;

Fig. 11 is an enlarged detail, being a sectional view of the transmission mechanism on line 11—11 of Fig. 8;

Fig. 12 is an enlarged view of part of the transmission mechanism, being a cross-section on line 12—12 of Fig. 11;

Fig. 13 is a longitudinal vertical section of the drive gears by which the direction in which the truck travels is controlled, being a section on line 13—13 of Fig. 2;

Fig. 14 is a cross-section on line 14—14 of Fig. 13;

Fig. 15 is a partial vertical cross-section on line 15—15 of Fig. 13;

Fig. 16 is a longitudinal vertical section of the cylinder and piston by which the platform is raised or lowered, with the valve mechanism associated therewith;

Fig. 17 is a horizontal section on line 17—17 of Fig. 16;

Fig. 18 is a partial vertical section on line 18—18 of Fig. 19 showing the gear pump used for maintaining the oil pressure by which the piston shown in Fig. 16 is operated;

Fig. 19 is a horizontal section on line 19—19 of Fig. 18;

Fig. 20 is an enlarged partial vertical section on line 20—20 of Fig. 6 showing the lever by which the speed and direction of travel of the truck are controlled;

Fig. 21 is a partial horizontal section on line 21—21 of Fig. 20; and

Fig. 22 is a vertical cross-section on line 22—22 of Fig. 20 showing a part of the dashboard in front elevation.

As shown in Fig. 2, my improved truck comprises a rigid main frame composed in part of two parallel side bars 25, 26 spaced a suitable distance apart and connected at their rear ends by a cross bar 27, and at their front ends by a cross bar 28 shown in dotted lines in said figure. At the front end of the main frame is an operator's platform 29, and rising from the inner margin of said platform is a vertically-disposed plate or dashboard 30 which forms the front wall of a housing or hood which encloses the operating machinery. The upper portion of the dashboard is provided with an opening through which is exposed a radiator 31, such as are commonly used in automobile vehicles, for cooling the water which circulates around the motor cylinders, and, preferably, the radiator is protected by a series of guard strips 32 as shown in Fig. 1. At the upper left hand corner of the dashboard 30 as viewed in Fig. 1, is a vertical slot 33 in which operates a steering lever 34, the connections of which will be hereinafter described, and at the opposite upper corner of said dashboard is a short slot 35 over which is fitted a guard plate 36, preferably bearing the inscriptions "Lower" and "Lift", respectively above and below said slot. Through the slot 35 extends a lever 37 which controls the raising or lowering of the lifting platform, the connections of said lever being such that by moving it upward the platform will be lowered, and by moving it downward the platform will be lifted. This, however, is merely a preferable arrangement. In proximity to the guard plate 36 is a box 38 having an H-shaped slot of the type commonly used on automobile vehicles in connection with a gear shift lever of the selective type, and through this box operates a gear shift lever 39 which carries a throttle lever 40 mounted on it, so that the operator grasping the handle of the lever 39 may easily operate the throttle which normally stands in its closed position. These parts are shown on a larger scale in Figs. 20 and 22, which will be referred to more in detail hereafter, but it should be explained at this time that the central transverse portion 41 of the H slot in the box 38 indicates the neutral position of the lever 39. The lever 39 is moved into the vertical left hand slot 42 for forward direction, and into the slot 43 for reverse direction. For high speed, forward or reverse, the lever is moved to the lower end of the appropriate slot 42 or 43, and for slow speed to the upper end thereof. This arrangement, also, is preferable but not essential.

Also mounted on the dashboard preferably near the lower end of the slot 33, is a hand operated switch 44 for controlling the ignition circuit to the spark plugs of the cylinders, and below the opening for the radiator 31 is an opening 45 through which projects a crank connection 46 by which the engine may be cranked. Preferably, opposite the lower right hand corner of the dashboard as it appears in Fig. 1 is a gasoline tank 47, supported at the bottom by brackets 48 secured to the platform 29, the upper portion of said tank being secured to the dashboard by a clip 49. 50 indicates a filler pipe through which the tank 49 may be filled, and 51 indicates a pipe leading from the gasoline tank to the engine, and preferably connected with a vacuum feed tank 52, shown in Fig. 7, such as are commonly used in automobiles.

Extending over a recess 53 in the platform 29 is a foot lever 54 which, as will be hereinafter explained, is connected with two brakes, one of which operates on the propeller shaft, and the other of which is a retarding brake associated with the transmission mechanism. Both of these brakes are normally set by spring pressure, and at that time the lever 54 stands in its elevated position shown in Fig. 1. By depressing said lever to substantially the level of the surface of the platform 29, both of these brakes are released, as will hereinafter appear. Ordinarily, the operator stands with one foot on said lever when he is operating the truck, but if he should step out of operative position, or descend from the platform 29, the lever 54 would be released and the brakes would at once be set. By this arrangement, therefore, the danger of accident is materially reduced, if not eliminated.

The operating machinery is mounted on the main frame back of and adjacent to the dashboard 30, and is enclosed by a housing comprising side plates 55 and an end plate 56 secured together and to the dashboard in the form of an open-ended box, which is firmly secured to the frame of the machine in any suitable way which leaves it capable of being removed if necessity should require. This constitutes the lower portion of the housing, the upper portion being composed of a boxlike structure or hood 57, which is hinged to the upper margin of the plate 56 by hinges 58, as shown in Fig. 7, so that it may be swung back over the rear portion of the truck to expose the operating machinery. The front portion of the hinged member 57 of the housing fits against the upper portion of the dashboard 30, and it is preferably provided at the top with handles 59 by which it may conveniently be moved into or out of operative position. It is also preferably provided with a marginal flange 60, which overlaps the upper margin of the dashboard 30, as shown in Fig. 1, so that the closure is comparatively tight. The rear portion of the hood 57 is inclined as shown at 61 in Fig. 1, so that the operator standing on the platform 29 has a clear view of the rear end of the truck and, consequently, may steer it accurately when the truck is being driven in reverse, as is always the case when a load is to be taken up. At such times it is necessary for the operator to guide the lifting platform under the stationary frame on which the load is piled, which frequently is in the form of a box supported on legs between which the lifting platform must be inserted. Consequently, if the truck should not be guided carefully it would be apt to hit one of the legs and not only damage the box, but spill the load, with possible injury to bystanders. These trucks must also be driven through shops and in other places where space for maneuvering is very limited, so that very accurate steering is required, and, therefore, it is of the utmost importance that the operator have an unobstructed view of his surroundings, and by inclining the hood 57, as shown, this is provided for.

As shown in Fig. 1, the lifting frame or platform, which is indicated by reference numeral 62, overlies the rear portion of the main frame and extends from the rear plate 56 of the housing to the rear end of the truck. Referring now to Figs. 2 and 4, it will be seen that depending from the under surface of the platform, adjacent to its four corners, are brackets 63 which are pivotally connected to arms 64, non-rotatably secured to the end portions of two transversely-disposed shafts 65, 66, journaled in suitable bearings in brackets 67 secured to the side members 25, 26 of the main frame. By rotating the shaft 65, 66 the arms 64 may be swung vertically between the limits illustrated by the full line and dotted line positions of said parts, as shown in Fig. 4, thereby raising or lowering the platform 62. The full line position shows the platform raised to approximately its extreme height, while the dotted lines show its lowermost position. It will also be apparent that when the lifting platform is raised or lowered, it will move endwise, owing to the swinging of the arms 64 about the shaft 65, 66 as their axes, but the direction of its movement is mainly vertical, so that it may properly be said to be movable vertically, notwithstanding the fact that its ends do not move up and down absolutely in transverse vertical planes. Its side margins do however move vertically in longitudinal vertical planes. For the purpose of rocking the shafts 65, 66 to raise or lower the platform, a rock shaft 68 is provided which extends transversely of the main frame and is suitably journaled upon the side members 25, 26 thereof, preferably by means of brackets 69 shown in Fig. 5. This shaft is provided with two cranks 70, 71 shown in Fig. 2. The crank 70 is connected by a connecting rod 72 with a crank 73 carried by the shaft 65, while the crank 71 is connected by a connecting rod 74 with a crank 75 carried by the shaft 66. Therefore, by rocking the shaft 68 in either direction, the shafts 65, 66 will be rocked correspondingly. The shaft 68 also carries a segmental gear 76, as shown in Fig. 4, which meshes with a rack 77 connected with the piston rod of a power operated piston which will be hereinafter described. It will be understood, therefore, that by reciprocating said piston rod the shaft 68 may be rocked in one direction or the other, thereby raising or lowering the lifting platform.

The rear portion of the main frame is supported by two wheels 78 mounted and keyed to opposite ends of a rear axle 79 shown in Figs. 2 and 4, said axle being journaled in suitable bearings provided for that purpose on the side bars 25, 26 of the main frame. The wheels 78 are so placed that they lie between the side margins of the lifting platform, as shown in Figs. 1 and 2. The rear axle 79 is provided with a bevel gear 80, which meshes with a driving pinion 81 carried at the rear end of a stub propeller shaft 82 mounted in suitable bearings in a housing 83, as shown in Figs. 2 and 5. Preferably, the rear axle gearing is also enclosed in a housing 84 shown in Fig. 2. The stub propeller shaft 82 is connected by a universal connection 85 with a main propeller shaft 86, which in turn is connected by a universal connection 87 with drive gearing which will be hereinafter described. At this time it will suffice to remark that when the main propeller shaft 86 is rotated in one direction or the other, the rear axle 79 will be correspondingly rotated, and through the rear wheels 78 will propel the truck in one direction or the other.

The front portion of the main frame is supported by dirigible wheels 88, 89, the mountings and connections of which are best shown in Figs. 2 and 6. Referring particularly to Fig. 6, it will be noted that said wheels are mounted on ball bearings running on shafts 90 carried respectively by yokes 91, 92. Each of these yokes is provided with a cylindrical stem 93, in which is an axially disposed pin 94, keyed thereto preferably by cross pins 95, 96 as shown at the left of Fig. 6, and upon these pins 94 are mounted arms 97, 97ᵃ which are secured in place by a nut 98 screwed upon the upper end of the pin. The stems 93 are journaled in sleeves 99 carried at the opposite ends of a V-shaped crosshead 100, the apex of which is provided with a sleeve 101 adapted to receive a pivot 102, which is supported by a transversely-disposed bracket 103 secured to the side members 25, 26 of the main frame. Thus the crosshead 100 forms an equalizer bar between the two wheels 88, 89, and serves as a support for the forward portion of the main frame of the truck. The pivot 102 is located at the transverse center of the truck, and consequently it cooperates with the rear wheels to form a three point support for the truck frame which permits the frame to accommodate itself to the unevenness of the floor or surface of the ground on which it rests, thereby eliminating the danger of distortion or binding of the lifting mechanism, in consequence of any such irregularities, which would otherwise ensue. As shown in Fig. 2, the crosshead 100 is preferably bifurcated, so that it straddles the bracket 103, and therefore has a more stable support thereon. As best shown in Fig. 2, the arms 97, 97ᵃ extend forward from the pins 94, and they are cross connected by a connecting rod 104 so that they swing laterally in unison. These arms are keyed to their respective pins 94, and consequently lateral swinging of said arms operates to turn the yokes 91, 92 about their vertical axes, thereby directing the wheels 88, 89 toward one side or the other for steering the truck. The arms 97, 97ᵃ are actuated to steer the truck by vertical movement of the steering lever 34, which, as shown in Fig. 3, is mounted upon a pivot 105, supported by a bracket 106 secured to an angle bar 107 which forms one of the side margins of the dashboard as shown in Fig. 2. The steering lever 34 is connected by a vertical rod 108 with one arm 109 of a bell-crank lever 110, which is mounted on a fulcrum 111 as shown in Fig. 6, so that said lever rocks in a transverse plane. The other arm 112 of said bell-crank lever is connected by a rod 113 with an arm 114 which forms a part of the arm 97 as shown in Fig. 7. It is obvious, therefore, that by moving the steering lever 34 downward, the bell-crank lever 110 will rock in a clockwise direction, as viewed in Fig. 6, thereby turning the yokes 91, 92 so that the truck will be guided to the right as viewed in said figure, and that upward movement of the steering lever from its central position will steer the truck in the opposite direction. Therefore, the operator standing on his platform may steer the truck by simply moving the lever 34 up or down. This, of course, he does with his left hand, so that his right hand is left free for operating the other two control levers which, as shown in Fig. 1, are at the opposite side of the dashboard.

The mechanism for propelling the truck comprises an internal combustion engine 115 of the kind used in automobiles, which in the illustration is shown as being of the water cooled type, 116, 117 indicating the connections between the water jacket of the engine and the upper and lower portions of the radiator 31. Associated with the engine and radiator is a fan 118, which may be driven by a belt 119 in the usual way, causing a current of air through the radiator. As the various parts and connections of motors of this description are well understood, it is deemed unnecessary to describe them, except in so far as they have to do with operations characteristic of the machine which forms the subject matter of this application. The several pistons of the engine operate in the usual way to drive a uni-directional crank shaft 120, as best shown in Fig. 8, which carries a fly wheel 121 and also a sprocket wheel 122 which is keyed thereon. This crank shaft is the main drive shaft from which power is transmitted to propel the truck and to raise or lower the lifting platform. The sprocket wheel 122 is connected by an endless belt 123 with a sprocket wheel 124 mounted on a pump shaft 125, and a sprocket wheel 126 mounted on a shaft 127 which forms a part of the transmission mechanism. The transmission shaft 127 is substantially in the same horizontal plane as the crank shaft 120, and the pump shaft 125 is arranged above and between the other two shafts so that said shafts are in triangular relation to each other, as shown in Fig. 8, but this arrangement is non-essential. By this construction, when the crank shaft 120 is in rotation the other two shafts will be continuously rotated.

Referring now to Fig. 11, it will be observed that the right hand end of the transmission shaft 127 as viewed in Fig. 11, is supported in a ball bearing 128, mounted on a standard 129 secured to the main frame, preferably by means of a supporting frame 130, said supporting frame being preferably provided with a flange 131 at one end upon which the standard 129 is secured. This flange is best shown in Figs. 9 and 11. The opposite end of the shaft 127 bears in a socket 132, formed in one end of a complementary shaft 133 which is in axial alinement with the shaft 127 but is not directly connected therewith. The outer end portion of the shaft 133 is supported by a ball bearing 134, mounted in a standard 135, and also supported by the frame 130 in much the same way as the standard 129, a flange 136 similar to the flange 131 being provided at the opposite end of said frame for that purpose. The complementary shaft 133 carries a sprocket wheel 137, which is keyed thereto, and also a brake pulley 138, which may be non-rotatably secured to said shaft in any suitable way, but which is shown as being held in place by a nut 139 screwed upon the outer end of the shaft 133. At its inner end the shaft 133 carries a spur pinion 140, which is preferably formed integral therewith and flush with the inner end of said shaft, and between said pinion and the ball bearing 134 there is loosely mounted on the shaft 133 a sleeve 141 which forms the hub of a bell-shaped housing 142, provided with a radial flange 143 near its outer margin. Secured to this radial flange by bolts 144 is a transverse radial disc or cover plate 145, having a hub 146 which bears upon an intermediate portion of the shaft 127, as shown in Fig. 11. Thus the cover plate 145 and the housing 142 form a comparatively tight chamber 147 which encloses the pinion 140 and various other parts of the mechanism which will be hereinafter described. By filling this chamber with grease or other lubricant, the parts enclosed therein will not only be protected from dust and dirt, but will always be maintained in a proper state of lubrication. Extending through the chamber 147, and supported in suitable bearings in the housing 142 and disc 145, are pins 148, preferably two in number, which pins are arranged parallel with the shafts 127 and 133. On each of said pins is mounted a spur gear 149 which meshes with the pinion 140 on the shaft 133, and a gear 150 which is adapted to mesh with a spur pinion 151 mounted upon and keyed to the shaft 127. Preferably, the gears 149 and 150 of each pair are made integral with each other, as shown in Fig. 11. The object of using two or more pairs of the gears 149 and 150 is to balance the apparatus. Any desired number may be employed, although two pairs will ordinarily be sufficient.

The disc 145 is provided with a laterally-extending annular flange 152, the inner and outer faces of which form braking surfaces so that said disc and flange together constitute in effect a brake drum, which is non-rotatably connected with the housing 142 and normally is free to rotate independently of the shafts 127 and 133. It will be evident, however, that by providing means for non-rotatably connecting this brake drum 152 to the shaft 127 the housing 142 with the pins 148 mounted therein will be caused to rotate so that the gears 149, 150 will revolve, or have a planetary motion about the axis of said shaft. When this occurs, the gears 150 at opposite sides of the pinion 151 will be held against rotation about their own axes, and consequently, by reason of the engagement of the gears 149 with the pinion 140, the shaft 133 will be caused to rotate in the same direction and at the same speed as the shaft 127. It will be understood, also, that if the housing 142 and flange 152 are left disconnected from the shaft 127, and are locked against rotation, rotary movement of the shaft 127 will then be transmitted to the shaft 133 but at a slower rate, by reason of the engagement of the gear 150 with the pinion 151, and the engagement of the pinions 149 and 140, which will then constitute a set of speed reducing gears for communicating the rotary movement of the shaft 127 to the shaft 133. For the purpose of causing the housing 142 and disc 145 to rotate with the shaft 127 when desired, an expanding brake shoe 153 is provided, which is mounted inside of the flange 152 and extends around the peripheral portion of a spider 154 having a hub 155, by which it is mounted upon and keyed to the shaft 127, as shown in Fig. 11. This spider, therefore, constantly rotates with the shaft 127. The brake shoe 153 being carried by the spider 154 also rotates with the shaft 127, but normally it is inoperative, as it is held out of contact with the flange 152 as shown in Fig. 11. It is moved into operative position by means of a spring 156, one end of which is connected to the spider 154, as shown in Fig. 12, while its other end is connected with one arm of a curved lever 157, fulcrumed upon the spider 154 by means of a pivot 158. The lever 157 is operatively connected with the brake shoe 153 by means of an arm 159 fixedly connected with said lever, and connected by a link 160 with toggle links 161, 162, the opposite ends of which are connected respectively with the separated end portions of the shoe 153. The links 161, 162 are normally out of alinement, but the spring 156 tends to move them toward a position in alinement with each other, and, consequently, acts to spread apart the adjoining ends of the shoe and thereby cause it to operatively engage the inner surface of the flange 152. The brake shoe is normally held in inoperative position by means of a pin 163, radially disposed with reference to the axis of the shaft 127, and adjustably mounted in an arm 164 which forms a part of the lever 157, or is fixedly connected therewith in any other suitable way. The inner end of the pin 163 bears against a sleeve 165 which is loosely mounted on the shaft 127, preferably upon the hub 155 of the spider 154, and is movable longitudinally independently thereof. The inner end portion of this sleeve is tapered, as shown at 166 in Fig. 11, so that it acts as a wedge to move the pin 163 radially, and thereby rock the lever 157 about its fulcrum 158. It will be apparent that when the sleeve 165 occupies the position shown in Fig. 12, the lever 157 will be in its inoperative position shown in said figure, but by moving the sleeve 165 to the right as viewed in Fig. 11, far enough for the pin 163 to move down on the tapered surface 166 of said sleeve, the spring 156 will be permitted to rock the lever 157 in a clockwise direction as viewed in Fig. 12, thereby expanding the brake shoe 153 into engagement with the flange 152, with the result that the housing 142 and disc 145 will be locked in non-rotatable relation to the shaft 127, thereby causing the shaft 133 to rotate in unison with the shaft 127 as already described. The sleeve 165 is moved longitudinally by moving the lever 39 vertically from its intermediate position in either of the slots 42 or 43 shown in Fig. 22. The connections by which this is accomplished will now be described. As shown in Fig. 20, the lever 39 is provided at its inner end with a yoke 167 which fits closely upon the upper and lower surfaces of a block 168 carried by and keyed to a horizontal shaft 169 mounted in a bracket 170 secured to the rear face of the dashboard 30. The yoke 167 is pivotally connected with the block 168 so that it may swing in a horizontal plane, by a vertical pin 171. By this construction, if the lever 39 be swung up or down it will rock the shaft 169. Non-rotatably secured upon one end portion of the shaft 169 is a depending bar 172, as shown in Figs. 6, 7 and 21. The lower end of this bar is connected by a connecting rod 173 with a lever 174 shown in Figs. 7 and 11, which, as shown in the latter figure, is fulcrumed at its lower end upon a shaft 175 carried by brackets 176 suitably secured to the frame 130, as best shown in Fig. 9. Mounted on the shaft 175, adjacent to the lever 174, is a sleeve 177, which is connected with the lever 174, preferably by keying said lever and said sleeve to the shaft 175, so that by rocking said lever the sleeve 177 may also be rocked. The sleeve 177 carries a yoke 178, best shown in Fig. 9, which as shown in Fig. 12 is provided with inwardly-projecting pins 179 at diametrically opposite points, which engage an annular groove 180 formed in the sleeve 165. As shown in Figs. 11 and 12, rocking of the lever 174, therefore, will operate to move the sleeve 165 longitudinally of the shaft 127 to actuate the internal brake 153, and it will be apparent that when the control lever 34 is moved downward the sleeve 165 will be moved to the right as viewed in Fig. 11, thereby permitting the brake actuating member 157 to be operated by the spring 156 to set the brake. Movement of the control lever 34 in the opposite direction will, of course, release the internal brake.

To drive the truck in either direction at slow speed, the housing 142, disc 145 and brake drum 152 are locked against rotation by means of an external brake band 181, best shown in Figs. 9, 11 and 12, which is much like the external brake commonly used on automobiles. It is a split circular band supported at a point approximately opposite its separated ends by a bracket 182 secured to the frame 130. At one of the ends 183 of said brake band is a lug 184, to which is connected a bolt 185, provided with a yoke 186 at its lower end, which is connected by a pivot 187 with said lug, as shown in Figs. 9 and 12. The upper end of said bolt moves through the upper portion of an inverted U-shaped bracket 188 secured to the frame 130, as best shown in Fig. 9, and above said bracket it is provided with a nut 189 screwed thereon, and provided at its lower margin with a series of recesses 190, as shown in Fig. 12. Between the lower surface of the nut 189 and the upper end of the bracket 188 is an arm 191, carried by a sleeve 192 which is keyed upon the end portion of a rock shaft 193, the adjacent end of which is journaled in lugs 194 secured to the opposite end 181' of the brake band 181. The arm 191 is perforated so that the bolt 185 may pass through it, and on its upper surface it is provided with upwardly projecting lugs 195 adapted to enter the recesses 190 in the nut 189, as shown in Fig. 12, thereby holding the nut 189 against rotation so long as the lugs 195 are in engagement therewith. It will be apparent from the foregoing that by rocking the shaft 193 in a clockwise direction as viewed in Fig. 12, the bolt 185 may be moved upward, thereby drawing the separated ends of the brake band 181 toward each other and applying the brake to the outer surface of the flange or brake drum 152. The ends of said brake band are normally held apart by a spring 196 mounted upon a rod 197, one end of which is connected with the end 183 of the brake band by a bracket 197ª carried by the lug 184, while the opposite end of said rod extends between the collar 192 and the outer surface of the opposite end 181ª of the brake band in such manner that the upper end of the spring 196 bears against the lugs 194. By this arrangement, when the ends of the brake band are drawn together, they tend to compress the spring 196, which, therefore, tends to hold them apart. The shaft 193 is rocked to apply or release the outside brake by means of the controlling lever 39, which is operatively connected with it by means of a rearwardly projecting crank arm 198 mounted upon and keyed to the shaft 169, as shown in Figs. 7 and 21. This crank arm is connected by a connecting rod 199 with a crank arm 200 non-rotatably secured to the shaft 193, as shown in Figs. 6 and 7. Consequently, when the controlling lever 39 is moved upward from its neutral position, the crank 198 will be moved downward, thereby moving the crank 200 in the same direction and rocking the shaft 193 in a clockwise direction as viewed in Figs. 6 and 12. This will cause the brake band 181 to grip the brake drum 152 and hold it against rotation, so that the transmission mechanism will be operatively connected for driving at slow speed in the manner already described. Preferably, the rod 199 is yieldingly connected with the crank 200 by extending the lower end of said rod through a boss 201 on the end of the crank 200, and interposing a spring 202 between said boss and a collar 203 on the rod 199, as best shown in Fig. 6. The forward end of the rock shaft 193 is supported in a bearing formed in a bracket 204, secured to a vertically disposed angle iron 205 which forms one of the corners of the dashboard, as shown in Fig. 6.

From the foregoing explanation it will be understood that through the transmission mechanism the sprocket wheel 137 at the left hand end of said transmission mechanism as viewed in Fig. 11 may be driven either at high speed or at slow speed, or it may be released from positive driving connection with the shaft 127 by leaving the two brakes in inoperative relation to the brake drum 152. This sprocket wheel serves to drive the truck through forward and reverse drive gears by means of connections which will now be described. As shown in Figs. 7, 8 and 9, an endless chain 206 operates on the sprocket wheel 137 and connects it with a sprocket wheel 207 which is mounted upon and keyed to a shaft 208, best shown in Figs. 13, 14 and 15, which forms a part of the driving gearing just referred to. This shaft is mounted in ball bearings 209, 210, in what for convenience will be termed a reverse box 211, since it contains the gearing by which the direction of movement of the truck is controlled. In the construction shown, this reverse box is mounted on the side bars 25, 26 of the main frame, as shown in Figs. 8 and 9. Loosely mounted upon the end portions of the shaft 208 are spur pinions 212, 213, which are respectively provided at their inner sides with clutch members 214, 215, shown in Fig. 13, and between said clutch members is a double faced clutch member 216, which is mounted on a feather on the shaft 208 so that it may be moved longitudinally thereof and at the same time will rotate therewith. The clutch member 216 is movable into engagement with the clutch members 214, 215 alternatively, and normally occupies an intermediate position out of engagement with both, as shown in Fig. 13. The clutch member 216 is provided with an annular groove 217, adapted to receive inwardly projecting pins or trunnions carried by a yoke 218 that forms a part of a sleeve 219 mounted on a rock shaft 220, which extends transversely of the central portion of the shaft 208 and is suitably journaled in the box 211. By rocking said shaft, therefore, the clutch member 216 may be moved to connect either of the pinions 212, 213 with the shaft 208.

The pinion 212 is constantly in mesh with a spur gear 221, which is mounted upon and keyed to one end portion of a drive shaft 222, which also is mounted in ball bearings 223, 224 in the box 211, as shown in Fig. 13. Also mounted on and keyed to the drive shaft 222 is a smaller spur gear 225 which is in line with the spur pinion 213 but does not directly mesh therewith. These members are, however, connected by a pinion 226 carried by a counter-shaft 227 mounted in roller bearings in the box 211, as shown in Fig. 14. Obviously, when the shaft 208 is rotated and the pinion 213 is connected therewith by means of the clutch member 216, the drive shaft 222 will be rotated through the instrumentality of the reverse gear 226. When, however, the pinion 212 is connected with the shaft 208 by the clutch member 216, the drive shaft 222 will be directly rotated through the gear 221. The direction of rotation of the drive shaft 222 may, therefore, be controlled by shifting the clutch member 216 so as to connect one or the other of the pinions 212, 213 with the shaft 208. The drive shaft 222 carries at its rear end, which is the right hand end shown in the illustration of Fig. 13, a drum 228, which is keyed thereto and is connected with the propeller shaft 86 by means of the universal coupling 87, as best shown in Fig. 9. Preferably, the housing 229 of this coupling is provided with a radial flange 230, which is adapted to fit against the outer face of the drum 228 and to be secured thereto by bolts 231, thereby holding the propeller shaft in operative connection with said drum. Said propeller shaft, therefore, forms substantially a continuation of the drive shaft 222.

The shaft 220 is rocked to shift the clutch member 216 for the purpose of changing the direction of movement of the truck, by lateral movement of the controlling lever 39 through the horizontal slot 41 in the box 38, this being accomplished by means of an arm 308 mounted on and keyed to the shaft 220, as shown in Figs. 14 and 15, and connected by a connecting rod 309, shown in Figs. 6 and 7, with a laterally extending arm 310 secured to the lower end of a vertical shaft 311. The upper end of this shaft is journaled in a bearing 312 in the bracket 170, shown in Fig. 20, and is fixedly connected by a pin 313 with the lower end of a curved bracket 314, the upper end of which is pivotally connected by a pivot 315 with the upper portion of the bracket 170, the arrangement being such that the bracket 314 is adapted to swing about a vertical axis coincident with the axis of the shaft 311. The bracket 314 is provided with a vertical slot 316, best shown in Figs. 6 and 20, into which slot extends a finger 317 which forms an extension of the lower member of the yoke 167 at the inner end of the controlling lever 39, as best shown in Fig. 20. The purpose of the slot 316 is to permit the lever 39 to be swung vertically while it maintains its operative connection with the bracket 314. Obviously, when the controlling lever 39 is swung laterally about the pin 171 as an axis, it will swing the bracket 314 about a vertical axis and, consequently, rock the shaft 311, thereby swinging the arm 310 about the axis of said shaft. This movement will be transmitted by the connecting rod 309 to the arm 308, thereby rocking the shaft 220 to move the clutch member 216 endwise of the shaft 208 and moving it into operative engagement with one or the other of the pinions 212 or 213. In the arrangement shown, movement of the lever 39 to the left, as viewed in Fig. 22 connects the gears for driving the truck in a forward direction, while movement of said lever to the right makes the necessary connections for driving the truck in a reverse direction.

It has been explained that the foot lever 54 on the operator's platform operates a brake on the propeller shaft, and the instrumentalities by which this is accomplished will now be explained. The drum 228 on the shaft 222 is intended to operate also as a brake drum in cooperation with an external brake 232 mounted in the usual way. One of the separated ends of this brake is provided with a lever 233, connected therewith by a pivot 234, as shown in Fig. 9, and operatively connected with a lug 235 on the opposite end of the brake band by a yoke bolt 236. A spring 237 mounted on the bolt 236 tends to move the separated ends of the brake apart, and a spring 238 connected with the lever 233 and with the frame of the truck normally pulls said lever to the left as viewed in Fig. 9, so that the brake is in operative engagement with the drum 228. The arrangement of these parts is clearly shown in Figs. 8 and 9. The foot lever or pedal 54 is connected with the brake operating lever 233 by means of a connecting rod 239, one end of which is connected with the upper end of said lever and the other end of which is connected with one arm 240 of a bell-crank lever 241 mounted on a vertical pivot 242 supported by the frame of the machine, as shown in Fig. 9. The other arm 243 of said bell-crank lever is connected to a connecting rod 244, which extends to a point near the front of the truck and is connected to an arm 245 mounted on and secured to a rock shaft 246 which forms the pivot of the foot lever 54, as shown in Figs. 2, 7 and 9. By this construction the spring 238 will normally hold the foot lever 54 in its uppermost position, and, consequently, when said foot lever is depressed, the brake lever 233 will be moved to the right, as viewed in Figs. 8 and 9, thereby releasing the brake.

It has been remarked that when the inner and outer brakes of the transmission mechanism are inoperative there will be no positive driving connection between the sprocket wheel 137 and the shaft 127, but as in this situation the housing 142 will be rotated by reason of the engagement of the gears 150, 151, provided the engine is in operation, and as this will tend to rotate the sprocket wheel 137 and through it the shaft 208 and the clutch member 216, so that the free engagement of said clutch member with either of the cooperating clutch members will be to some extent interfered with, thereby making the shifting of gears noisy, it is desirable that means be provided for holding the sprocket wheel 137 against rotation when the truck is not in motion, as well as for stopping it promptly when the motion of the truck is stopped, or at least slowing it down very materially to facilitate gear shifting. For this purpose I provide what will be termed a retarding brake, in the form of a flexible band 247 which operates on the surface of the brake drum 138, shown in Figs. 9, 10 and 11. One end of this band is secured to the frame of the machine, as shown in Fig. 10, while its opposite end is connected to an arm 248 carried by and rocking with a rock shaft 249, as shown in Fig. 9. This rock shaft extends rearwardly and at its rear end is provided with an arm 250, which is connected by a connecting rod 251 with the brake operating lever 233. The arrangement is such that movement of the brake lever 233 to the left as viewed in Fig. 9 will rock the shaft 249 in a clockwise direction as viewed in Fig. 10, thereby tightening the brake band 247 on the drum 138 and either stopping it or materially reducing its rate of rotation. Obviously, as the brake 233 is controlled by the pedal or foot lever 54, when said pedal is depressed to release the propeller shaft brake it will also release the retarding brake 247, and vice versa.

It has been explained that the raising and lowering of the platform 62 is effected through a rack bar 77 connected with the piston rod of a piston, and the devices by which this rack bar is reciprocated for the purpose of controlling the position of the platform will now be described. Referring particularly to Figs. 7 and 16, 252 indicates a fluid pressure cylinder which is suitably mounted on the frame of the machine, preferably at one side of the reverse box, as shown in Figs. 7 and 8, and 253 indicates a piston operating in said cylinder and having a piston rod 254 which extends rearwardly of the truck through the rear head 255 of the cylinder and is connected with the rack bar 77, as shown in Fig. 4. Reciprocation of the piston 253 will, therefore, reciprocate said rack bar and consequently will raise or lower the platform 62. The piston 253 is designed to be operated by oil pressure supplied by an oil pump 256, which, as shown in Fig. 8, is mounted on a pedestal 257 supported by the frame of the machine. (See Figs. 7 and 8.) This oil pump is preferably of the gear type and comprises the shaft 125 which carries the sprocket wheel 124 already described, and is, therefore, constantly driven when the engine is in operation by the chain 123, as best shown in Fig. 8. The shaft 125 carries a gear 258 which meshes with a gear 259 mounted on a counter-shaft 260, as best shown in Fig. 18, both of these gears being, of course, enclosed by the housing of the pump. At one side of said housing is provided an inlet pipe 261, and at the opposite side an outlet pipe 262, as shown in said figure and also in Fig. 19. When, therefore, the pump is in operation oil is drawn in through the inlet 261 and is discharged under pressure through the outlet 262. The outlet pipe 262 extends from the pump to and connects with an inlet port 263 in a valve box 264, mounted upon the cylinder 252 as shown in Fig. 16, and the inlet pipe 261 of the pump extends to and communicates with an outlet port 265 at the opposite side of said valve box, as best shown in Fig. 17. The two ports 263, 265 communicate with a valve chamber 266 in said box, in which chamber is mounted a bushing 267 having ports 268, 269 which register with the ports 263, 265 respectively. It is also provided with two ports 270, 271 at right angles to the ports 268, 269, as shown in Fig. 17. The port 270 communicates with a duct 272 which leads to the left hand end of the cylinder 252 as viewed in Fig. 16, and the port 271 communicates with a duct 273 which leads to the right hand end of said cylinder. The admission of oil to the ducts 272, 273 is controlled by a valve 274 which is fitted in the bushing 267 and is adapted to be rotated therein by means of a stem 275 rising therefrom and having a crank arm 276 keyed thereto so that it rotates therewith. The valve 274 is provided with a straight passage 277 therethrough, as shown in Fig. 17, and with external grooves 278, 279 parallel with said passage. The passage 277 is adapted to aline with and connect the ports 268, 269 when the parts are in the position shown in Fig. 17, but it may be disconnected from said ports by rotating the valve, as indicated by dotted lines in said figure. When the valve is rotated in a clockwise direction, the groove 278 will come into position to connect the ports 268 and 270, while the groove 279 will connect the ports 269 and 271, or, if the valve be rotated in the opposite direction from the position shown in Fig. 17, the groove 278 may be used to connect the ports 269 and 270, and the groove 279 to connect the ports 268 and 271. It will be apparent, therefore, that by means of the valve 274 the pipe 262 may be connected directly with the pipe 261, cutting off the oil from admission to the cylinder 252 and forming a continuous circuit with the pump, in which case, of course, the oil forced by the pump will simply circulate through it without entering the cylinder 252, and consequently will have no effect on the piston 253. If, however, the valve 274 be turned so as to connect the pipe 262 with the passage 272, by which operation the pipe 261 will be connected with the passage 273, oil from the pump will be forced into the left hand end of the cylinder as viewed in Fig. 16, while the oil in said cylinder at the opposite side of the piston will be discharged through the passage 273 into the pipe 261, which is the inlet pipe to the pump. Consequently, the piston 253 will move toward the right as viewed in said figure. By turning the valve 266 in the opposite direction from its neutral position, oil will be forced into the right hand end of the cylinder, and will be exhausted through the duct 272 into the pipe 261, so that the piston will move in the opposite direction. The valve stem 275 is rocked to control the operation of the piston 253 by means of the control lever 37, which, as shown in Fig. 7, is fulcrumed upon a pivot 280, and has a rearwardly extending arm 281 that is connected by a connecting rod 282 with a horizontally extending arm 283 carried by a shaft 284, which is mounted in a bracket 285 secured to the dashboard 30, as shown in Fig. 7. The shaft 284 also carries two upright arms 286, 287, as shown in Fig. 6, all the arms 283, 286 and 287 being keyed to said shaft so that they turn therewith. The arm 287 is connected by a rod 288 with the arm 276 carried by the valve stem, as best shown in Fig. 7, and, therefore, when the lever 37 is moved up or down, the rocking of the shaft 284 effected thereby will rock the arm 287 and consequently swing the arm 276 forward or back, thereby rocking the valve stem 275 to control the admission of oil to the cylinder 252. In the arrangement shown the connections are such that upward movement of the lever 37 from its neutral position rocks the valve 274 in such direction as to admit oil to the left hand end of the cylinder, thereby forcing the piston to the right as viewed in Fig. 16, and consequently lowering the platform. When said lever is in its neutral position, the passage 277 in said valve will connect the pipes 261, 262, as shown in full lines in Fig. 17, and therefore the oil will circulate through the valve without entering the cylinder, and the piston 253 will remain stationary, since it will be held against movement by the oil which fills the cylinder at both sides of it and is trapped therein by the closure of the valve, due to the fact that the grooves 278, 279 will then be out of communication with the ports 268, 269.

From the foregoing description it will be seen that by means of the lever 37 the platform may be raised or lowered to any extent between the limits of its movement, that it may be stopped and held at any point, and that it may be reversed at any stage of its movement in either direction. Furthermore, as the oil pressure is always maintained by the pump, which operates constantly whenever the engine is in operation, the pressure necessary to raise or lower the platform is always instantly available. In order to avoid excessive pressure in the cylinder, and cut off the admission of oil to the cylinder when the platform reaches either extremity of its movement, the arm 286 is connected by a connecting rod 289 with one arm 290 of a bell-crank lever 291, which is best shown in Fig. 7. This lever is mounted on a fulcrum 292 and has a rearwardly extending arm 293 which is connected by a connecting rod 294 with a lever 295, fulcrumed between its ends at 296 on the frame of the machine. The rearwardly extending arm 297 of the latter lever extends under the forward portion of the platform 62, as best shown in Fig. 4, and over an inclined stop plate 298 carried by said platform. Preferably, the arm 297 is provided with a rounded head 299, so that it will slide readily on the inclined surface of the stop plate 298. These parts are so arranged that when the platform approaches the upper limit of its movement the stop plate 298 will engage the head 299, whereupon further upward movement of the platform will actuate the lever 295, and consequently will rock the shaft 284 in a counter-clockwise direction as viewed in Fig. 7, thereby actuating the arm 287 in the proper direction to cut off the admission of oil to the cylinder 252. In like manner, when the platform approaches its lowermost position the under side of the platform will strike the head 299 and rock the lever 295 in the opposite direction. This will rock the shaft 84 in a clockwise direction as viewed in Fig. 7, and the valve 274 will accordingly be operated to cut off the admission of oil from the cylinder. In either case the lever 37 will be restored to its neutral position by the automatic operation of the valve 274 above described. By this construction, also, the operator is prevented from moving the lever 37 in the wrong direction, as when the platform is in either of its extreme positions said lever can be operated only in one direction, by reason of the engagement of the head 299 with either the under side of the platform or the upper surface of the stop plate 298. This stop plate is preferably made inclined because of the endwise movement of the platform incident to its rising or falling movement.

It is desirably, also, that the pump 256 be provided with a safety valve to prevent creation of excessive pressure in case too heavy a load be placed on the platform, or to meet any other emergency which might arise tending to cause excessive pressure, and this I accomplish by providing the pump with an outwardly opening check valve 300, which normally closes a port 301 opening into the chamber of said valve at the outlet side thereof. This check valve is normally held on its seat by a spring 302, adjustably supported by a screw 303, as shown in Fig. 19. The port 301 communicates with a chamber 304, connected by a duct 305 with the inlet side of said valve chamber, as shown in said figure, and it will be apparent, therefore, that excessive pressure at the outlet side of the pump will force the check valve 300 from its seat, thereby connecting the outlet side of the pump with the inlet side thereof through the chamber 304 and duct 305. When this occurs, the pump gears will operate simply to circulate the oil through the pump without creating any further pressure in the circulatory system in which the valve 274 is included. The provision of these safety devices is important in connection with a gasoline operated truck of this kind, since the speed of the pump is dependent upon the speed of the engine, and if it were not for the safety valve associated with the pump, so great a pressure might easily be created as to damage the machine before it came to the notice of the operator. The oil in the system is used over and over again, but as there is some wastage, the supply is replenished by a reservoir 306 which is connected with the pipe 262 so as to feed thereto by gravity. This reservoir is closed by a cap 307, which is removable to permit the reservoir to be filled as occasion requires.

In operating my improved truck the operator, standing on the platform 29, first depresses the pedal 54, thereby releasing the propeller shaft brake and also the retarding brake. He then operates the lever 39 by moving it either to the right or to the left from its neutral position to connect the forward or the reverse gears, depending upon the direction in which he wishes to travel, and then moves said lever upward in the right or left hand vertical slot to start the truck at slow speed, which he may increase to high speed by simply moving said lever downward to the lower end of the slot in which it is operating. The speed may also be controlled by the throttle lever 40, which is connected with the engine in the usual way by a flexible connection 318 shown in Fig. 20. The left hand of the operator rests on the steering lever 34 and, as he has a clear view of his surroundings, he may readily guide his truck to the point where the load is to be taken up or deposited. Assuming that the load is to be taken up, the platform 62 being in its lowermost position, it is run under the frame or box on which the load has been placed, and stopped by moving the lever 39 to its neutral position and at the same time releasing the brake pedal 54. The lever 37 is then moved downward from its neutral position, which as has been explained, admits oil to the right hand end of the cylinder 252, thereby moving the piston to the left as viewed in Fig. 16, with the result that the platform will be raised to a greater or less extent, depending on how long the piston continues to move in that direction. Obviously, by manipulating the valve 274 by means of the lever 37, the operator may cut off the admission of oil to said cylinder at any time, thereby arresting the motion of the piston and holding the platform in statu quo because of the fact that the spaces in the cylinder at both sides of the piston will be full of oil, which cannot escape owing to the closure of both passages 272, 273 communicating with said cylinder. If the platform has not been raised to its highest point, its upward movement may be continued by properly operating the valve 274, or it may be lowered by operating said valve in the reverse direction. The operator, therefore, has complete control of the movement of the platform at all times, which is very desirable as it minimizes the danger of accident, and adapts the truck for use in many situations in which it could not be used if the platform could not be reversed at intermediate stages of its movement. It will be understood that at all times when the truck is in use the engine is in operation and the oil pump is also operating, but except when the valve 274 is moved from its neutral position the oil simply by-passes the cylinder 252 by flowing through the central passage 277 in said valve, or in case of excessive pressure it is short circuited around the pump by the action of the safety valve 300. The manner in which the valve 274 is returned to its neutral position whenever the platform reaches either limit of its movement has already been explained and need not be restated, and it is believed that sufficient explanation has already been given as to the operation of the rest of the mechanism. After the load has been taken up, it is transported to the point where it is to be deposited, and the platform is then lowered by upward movement of the lever 37, and it should be noted that the lowering of the platform is as much under the control of the operator as the raising of it, since it is effected not by gravity but by the direct application of power to the piston 253, and, therefore, the descent of the platform may be stopped at any point. The arrangement of the operating levers 37 and 39 by which they are both manipulated by the operator's right hand, is an advantageous one because it makes it necessary for him to release the throttle lever 40 before he can operate the lift control lever 37, and therefore it is impracticable for him to raise or lower the platform while the truck is in motion. The construction of the planetary transmission mechanism embodied in my improved truck contributes to its efficiency by reason of its simplicity and ease of operation, and also reduces the cost of manufacture, since the usual clutch is eliminated and only a single brake drum is necessary. Furthermore, the provision of the retarding brake makes it practicable to shift the reverse gearing easily and without objectionable noise. Also, the three point support for the main frame of the truck by which the front wheels may adapt themselves to inequalities of the floor or ground without affecting said frame, relieves the main frame and platform of twisting strains which would be apt to cause distortion or binding of the mechanism and interfere with its proper operation. In addition to these advantages, one of the most important is the fact that by using an internal combustion motor for supplying the power by which the several operations of the truck are performed, the costs of manufacture and upkeep are materially reduced, and very much greater service may be obtained from the truck since it can be used practically continuously. All that it is necessary to do is to supply it with gasoline and oil, whereas in the case of electrically operated trucks, unless reserve storage batteries are available, the truck can be used only about a third of the time, as the remainder is required for charging the batteries, and even if reserve batteries are used, not only is the initial investment much greater, but the work of substituting a fresh battery for a run down one is considerable, and, moreover, the efficiency of the battery depreciates as it is being used, so that toward the close of the operating period there is a deficiency of power. With my improved truck, on the contrary, the power is constant.

While I have explicitly described the embodiment of my invention illustrated in the accompanying drawings, I wish it to be understood that the claims hereinafter made are not intended to be restricted to the specific construction shown and described, except in so far as the claims are directed to details of construction, as in many respects my invention is generic in character, and the claims should, therefore, be construed accordingly.

The term "lifting platform" as herein used is intended to comprehend a frame or other equivalent structure designed to take up and support the load while it is being transported, whether it be strictly in the form of a platform or not.

What I claim as my invention and desire to secure by Letters Patent, is—

1. A lift truck comprising a main frame, a lifting platform supported at one end portion thereof, lifting means supporting said platform on said frame and operable to move the same upwardly meanwhile maintaining its horizontal position, propelling wheels supporting said frame and located under said platform, an operator's platform at the other end of said frame, dirigible wheels supporting the latter end of said frame, a motor mounted on said frame between said platforms, a unidirectional drive shaft disposed longitudinally of said frame and driven by said motor, a shaft extending longitudinally of said frame and connected with said drive shaft and with said propelling wheels for propelling the truck, means driven by said drive shaft and operatively connected with said lifting means for moving the lifting platform upwardly, and devices operable from the operator's platform for controlling the propulsion of the truck and the operation of said lifting means, respectively.

2. A lift truck comprising a main frame, a lifting platform supported at one end portion thereof, lifting means supporting said platform on said frame and operable to move the same upwardly meanwhile maintaining its horizontal position, propelling wheels supporting said frame and located under said platform, an operator's platform at the other end of said frame, dirigible wheels supporting the latter end of said frame, a motor mounted on said frame between said platforms, a unidirectional drive shaft extending longitudinally of said frame and driven by said motor, a power transmitting shaft extending longitudinally of said frame and operatively connected with said propelling wheels for driving the same, a pump shaft extending longitudinally of the frame and operatively connected with said drive shaft, a pump operated by said pump shaft, cylinder and piston mechanism operated by said pump and connected with said lifting means to move the lifting platform upwardly, and devices operable from the operator's platform for controlling the propulsion of the truck and the operation of said lifting means, respectively.

3. A lift truck comprising a main frame, a lifting platform supported at one end portion thereof, lifting means supporting said platform on said frame and operable to move the same upwardly meanwhile maintaining its horizontal position, propelling wheels supporting said frame and located under said platform, an operator's platform at the other end of said frame, dirigible wheels supporting the latter end of said frame, a motor mounted on said frame between said platforms, a unidirectional drive shaft extending longitudinally of said frame and driven by said motor, a power transmitting shaft extending longitudinally of said frame and operatively connected with said propelling wheels for driving the same, a pump shaft extending longitudinally of the frame and operatively connected with said drive shaft, a pump operated by said pump shaft, a member movable longitudinally of said frame and connected with said lifting means for actuating the same to move the lifting platform upwardly, cylinder and piston mechanism operated by said pump for actuating said longitudinally movable member, and devices operable from the operator's platform for controlling the propulsion of the truck and the operation of said lifting means, respectively.

4. A lift truck comprising a main frame, a lifting platform supported at one end portion thereof, lifting means supporting said platform on said frame and operable to move the same upwardly meanwhile maintaining its horizontal position, propelling wheels supporting said frame and located under said platform, an operator's platform at the other end of said frame, dirigible wheels supporting the latter end of said frame, a motor mounted on said frame between said platforms, a unidirectional drive shaft extending longitudinally of said frame and driven by said motor, a power transmitting shaft extending longitudinally of said frame and operatively connected with said propelling wheels for driving the same, a pump shaft extending longitudinally of the frame and operatively connected with said drive shaft, a pump operated by said pump shaft, a rack bar movable longitudinally of said frame, cylinder and piston mechanism actuated by said pump for reciprocating said rack bar, means actuated by reciprocation of said rack bar for actuating said lifting means to move the lifting platform upwardly, and devices operable from the operator's platform for controlling the propulsion of the truck and the operation of said lifting means, respectively.

5. A lift truck comprising a main frame, a lifting platform supported at one end portion thereof, lifting devices supporting the end portions of said platform on said main frame and operable to move the same upwardly meanwhile maintaining its horizontal position, propelling wheels supporting said frame and located under said platform between said lifting devices, an operator's platform at the other end of said frame, dirigible wheels supporting the latter end of said frame, a motor mounted on said frame between said platforms, a unidirectional drive shaft extending longitudinally of said frame and operated by said motor, power transmitting means driven by said shaft and operatively connected with said propelling wheels for driving the same, a pump shaft extending longitudinally of said frame and driven by said drive shaft, a member reciprocable longitudinally of said frame, a pump operated by said pump shaft, means operated by said pump for reciprocating said member, means operated by said member and operatively connected with said lifting devices for actuating the same, and devices operable from the operator's platform for controlling the propulsion of the truck and the operation of said lifting devices, respectively.

6. A lift truck comprising a main frame, a lifting platform supported at one end portion thereof, lifting devices supporting the end portions of said platform on said main frame and operable to move the same upwardly meanwhile maintaining its horizontal position, propelling wheels supporting said frame and located under said platform between said lifting devices, an operator's platform at the other end of said frame, dirigible wheels supporting the latter end of said frame, a motor mounted on said frame between said platforms, a uni-directional drive shaft operated by said motor and extending longitudinally of said frame, a shaft extending longitudinally of said frame and operatively connected with said propelling wheels for driving the same, means for driving the latter shaft from said drive shaft, means operated by said motor and operatively connected with said lifting devices for moving the lifting platform upwardly, and devices operable from the operator's platform for controlling the propulsion of the truck and the operation of said lifting devices, respectively.

7. A lift truck comprising a main frame, a lifting platform supported at one end portion thereof, lifting means supporting said platform on said frame and operable to move the same upwardly meanwhile maintaining its horizontal position, propelling wheels supporting said frame and located under said platform, an operator's platform at the other end of said frame, dirigible wheels supporting the latter end of said frame, a motor mounted on said frame between said platforms, a uni-directional drive shaft operated by said motor and extending longitudinally of said frame, a propeller shaft connected with said propelling wheels for driving the same, power transmitting devices connecting said shafts and operable to drive said propeller shaft in either direction, a pump shaft driven by said drive shaft, a pump driven by said pump shaft, cylinder and piston mechanism operated by said pump and connected with said lifting means for actuating the same to move the lifting platform upwardly, and devices operable from the operator's platform for controlling the propulsion of the truck and the operation of said lifting means, respectively.

8. A lift truck comprising a main frame, a lifting platform supported at one end portion thereof, lifting means supporting said platform on said frame and operable to move the same upwardly meanwhile maintaining its horizontal position, propelling wheels supporting said frame and located under said platform, an operator's platform at the other end of said frame, dirigible wheels supporting the latter end of said frame, a motor mounted on said frame between said platforms, a uni-directional drive shaft operated by said motor and extending longitudinally of said frame, a propeller shaft connected with said propelling wheels for driving the same, power transmitting devices connecting said shafts and operable to drive said propeller shaft in either direction, a pump shaft driven by said drive shaft, a pump driven by said pump shaft, a member reciprocable longitudinally of said frame and connected with said lifting means for actuating the same to move the lifting platform upwardly, cylinder and piston mechanism operatively connected with said pump for reciprocating said member, and devices operable from the operator's platform for controlling the propulsion of the truck and the operation of said lifting means, respectively.

9. A lift truck comprising a main frame, a lifting platform supported at one end portion thereof, transverse shafts mounted on said frame adjacent to the end portions of said platform, means connected with the end portions of said transverse shafts and with the end portions of said platform and operable by the rocking of said shafts to move said platform upwardly meanwhile maintaining its horizontal position, cranks on said transverse shafts, a rock shaft mounted on said frame and having cranks connected with said first-mentioned cranks for actuating said transverse shafts in unison, a member reciprocable longitudinally of said frame to rock said rock shaft, propelling wheels supporting said frame between said transverse shafts, an operator's platform at the other end of said frame, dirigible wheels supporting the latter end of said frame, a motor mounted on said frame between said platforms, a drive shaft driven by said motor, a propeller shaft connected with said propelling wheels for driving the same, power transmitting devices connecting said drive shaft with said propeller shaft, means driven from said drive shaft for reciprocating said reciprocable member to move the lifting platform upwardly, and devices operable from the operator's platform for controlling the propulsion of the truck and the upward movement of said lifting platform, respectively.

10. A lift truck comprising a main frame, a lifting platform supported at one end portion thereof, lifting means supporting said platform on said frame and operable to move the same upwardly meanwhile maintaining its horizontal position, propelling wheels supporting one end portion of said frame, dirigible wheels supporting the other end portion of said frame, an operator's platform carried by said frame, a motor mounted on said frame, a uni-directional drive shaft driven by said motor and disposed longitudinally of said frame, a power transmission shaft and a pump shaft parallel with said drive shaft, means for driving said power transmission shaft and said pump shaft from said drive shaft, means driven from said power transmission shaft for driving said propelling wheels in either direction, a pump driven by said pump shaft, and fluid pressure operated mechanism controlled by said pump for actuating said lifting means to move said lifting platform upwardly.

11. A lift truck comprising a main frame, a lifting platform supported at one end portion thereof, lifting means supporting said platform on said frame and operable to move the same upwardly meanwhile maintaining its horizontal position, propelling wheels supporting one end portion of said frame, dirigible wheels supporting the other end portion of said frame, an operator's platform carried by said frame, a motor mounted on said frame, a uni-directional drive shaft driven by said motor and disposed longitudinally of said frame, a power transmission shaft and a pump shaft parallel with said drive shaft, means for driving said power transmission shaft and said pump shaft from said drive shaft, means driven from said power transmission shaft for driving said propelling wheels in either direction, a pump driven by said pump shaft, and fluid pressure operated mechanism controlled by said pump for actuating said lifting means to move said lifting platform upwardly or downwardly.

12. A lift truck comprising a frame, a lifting platform mounted thereon at one end thereof to move upwardly meanwhile maintaining its horizontal position, propelling wheels supporting said frame and located under said platform, an operator's platform at the other end of said frame, dirigible wheels at opposite sides of the frame and located between said platforms, an internal combustion motor mounted on said frame between said platforms, a shaft driven in a constant direction by said motor, a pump having a pump shaft, fluid pressure operated mechanism controlled by said pump for moving said lifting platform upwardly, transmission mechanism driven by said first-mentioned shaft, means operated by said transmission mechanism for propelling the truck, and a chain operatively connecting said pump shaft and said transmission mechanism with said first-mentioned shaft.

13. A lift truck comprising a main frame, a lifting platform supported at one end portion thereof, lifting means supporting both end portions of said platform on said frame and operable to move the same upwardly meanwhile maintaining its horizontal position, propelling wheels supporting one end portion of said frame, dirigible wheels supporting the other end portion of said frame, an operator's platform carried by said frame, a motor mounted on said frame, a uni-directional drive shaft driven by said motor, means operated by said shaft and connected with said propelling wheels for driving the same in either direction, a liquid containing cylinder, a piston adapted to reciprocate therein, means operated by said piston and connected with said lifting means for actuating the same to move the lifting platform upwardly or downwardly, a pump driven by said drive shaft, connections whereby liquid under pressure created by said pump may be supplied to said cylinder at either side of said piston, or may be short circuited around said cylinder, valve mechanism for controlling the movement of said piston, means operable from the operator's platform for operating said valve mechanism, and means operated by up or down movement of the lifting platform to a certain position for actuating said valve mechanism to stop said piston.

14. A lift truck comprising a main frame, a lifting platform supported at one end portion thereof, lifting means supporting said platform on said frame and operable to move the same upwardly, meanwhile maintaining its horizontal position, propelling wheels supporting one end portion of said frame, dirigible wheels supporting the other end portion of said frame, an operator's platform carried by said frame, a motor mounted on said frame, a uni-directional drive shaft driven by said motor and disposed longitudinally of said frame, variable speed power transmission mechanism comprising a shaft parallel with said drive shaft and operatively connected therewith, means operated by said drive shaft and connected with said lifting means for actuating the same, means driven from said power transmission mechanism for driving said propelling wheels, and devices operable from the operator's platform for steering said dirigible wheels, for controlling the operation of said lifting means, and for controlling the speed of the truck.

15. A lift truck comprising a main frame, a lifting platform supported at one end portion thereof, lifting means supporting said platform on said frame and operable to move the same upwardly meanwhile maintaining its horizontal position, propelling wheels supporting one end portion of said frame, dirigible wheels supporting the other end portion of said frame, an operator's platform carried by said frame, a motor mounted on said frame, a uni-directional drive shaft driven by said motor and disposed longitudinally of said frame, variable speed power transmission mechanism comprising a shaft parallel with said drive shaft and operatively connected therewith, a pump shaft parallel with said drive shaft, a pump operated by said pump shaft, fluid pressure operated mechanism controlled by said pump for actuating said lifting means to move the lifting platform upwardly, means driven from said power transmission mechanism for driving said propelling wheels, and devices operable from the operator's platform for steering said dirigible wheels, for controlling the operation of said lifting means, and for controlling the speed of the truck.

16. A lift truck comprising a main frame, a lifting platform supported at one end portion thereof, lifting means supporting said platform on said frame and operable to move the same upwardly meanwhile maintaining its horizontal position, propelling wheels supporting one end portion of said frame, dirigible wheels supporting the other end portion of said frame, an operator's platform carried by said frame, a motor mounted on said frame, a uni-directional drive shaft driven by said motor and disposed longitudinally of said frame, variable speed power transmission mechanism comprising a shaft parallel with said drive shaft and operatively connected therewith, means operated by said drive shaft and connected with said lifting means for actuating the same, means driven from said power transmission mechanism for driving said propelling wheels, a brake associated with said transmission mechanism, a lever adjacent to the operator's platform, means actuated by said lever for operating said brake, and devices operable from the operator's platform for steering said dirigible wheels, for controlling the operation of said lifting means, and for controlling the speed of the truck.

17. A lift truck comprising a main frame, a lifting platform supported at one end portion thereof, lifting means supporting said platform on said frame and operable to move the same upwardly meanwhile maintaining its horizontal position, propelling wheels supporting said frame and located under said platform, an operator's platform at the other end of said frame, dirigible wheels adjacent to the operator's platform, means pivotally supporting said frame on said dirigible wheels to rock about a central longitudinal axis, a motor mounted on said frame between said platforms, a uni-directional drive shaft driven by said motor, means operated by said shaft for propelling the truck, means operated by said shaft and connected with said lifting means for actuating the same to move the lifting platform upwardly, means operable from the operator's platform and connected with said dirigible wheels for steering the same, and devices operable from the operator's platform for controlling the propulsion of the truck and the operation of said lifting means, respectively.

18. A lift truck comprising a main frame, a lifting platform supported at one end portion thereof, lifting means supporting said platform on said frame and operable to move the same upwardly meanwhile maintaining its horizontal position, propelling wheels supporting said frame and located under said platform, an operator's platform at the other end of said frame, dirigible wheels adjacent to the operator's platform, a cross-head pivotally connected with the frame to rock about a longitudinal axis, said dirigible wheels being swiveled in the end portions of said cross-head, a motor mounted on said frame between said platforms, a uni-directional drive shaft driven by said motor, means operated by said shaft for propelling the truck, means operated by said shaft and connected with said lifting means for actuating the same to move the lifting platform upwardly, means operable from the operator's platform and connected with said dirigible wheels for steering the same, and devices operable from the operator's platform for controlling the propulsion of the truck and the operation of said lifting means, respectively.

19. A lift truck comprising a main frame, a lifting platform supported at one end portion thereof, lifting means supporting said platform on said frame and operable to move the same upwardly meanwhile maintaining its horizontal position, propelling wheels supporting said frame and located under said platform, an operator's platform at the other end of said frame, dirigible wheels adjacent to the operator's platform, a transverse V-shaped cross-head pivotally connected with the frame to rock about a longitudinal axis, said dirigible wheels being swiveled in the end portions of said cross-head, a motor mounted on said frame between said platforms, a uni-directional drive shaft driven by said motor, means operated by said shaft for propelling the truck, means operated by said shaft and connected with said lifting means for actuating the same to move the lifting platform upwardly, means operable from the operator's platform and connected with said dirigible wheels for steering the same, and devices operable from the operator's platform for controlling the propulsion of the truck and the operation of said lifting means, respectively.

20. A lift truck comprising a main frame, a lifting platform supported at one end portion thereof, lifting means supporting said platform on said frame and operable to move the same upwardly, meanwhile maintaining its horizontal position, propelling wheels supporting one end portion of said frame, an operator's platform carried by said frame, dirigible wheels supporting the other end portion of said frame, a motor mounted on said frame between said platforms, a uni-directional drive shaft extending longitudinally of said frame and driven by said motor, a power transmitting shaft parallel with and driven by said drive shaft and operatively connected with said propelling wheels for driving the same, a pump shaft extending longitudinally of the frame and operatively connected with said drive shaft, a pump operated by said pump shaft, hydraulic mechanism connected with said pump and comprising a cylinder and a reciprocating piston, means operated by said piston for actuating said lifting means to raise or lower the lifting platform, and devices operable from the operator's platform to control the operation of said hydraulic mechanism to raise or lower the lifting platform, to hold the same at any elevation, and to reverse its movement at any stage thereof in either direction.

21. A lift truck comprising a main frame, a lifting platform supported at one end portion thereof, lifting means supporting said platform on said frame and operable to move the same upwardly, meanwhile maintaining its horizontal position, propelling wheels supporting one end portion of said frame, an operator's platform carried by said frame, dirigible wheels supporting the other end portion of said frame, a motor mounted on said frame between said platforms, a uni-directional drive shaft extending longitudinally of said frame and driven by said motor, a power transmitting shaft parallel with and driven by said drive shaft and operatively connected with said propelling wheels for driving the same, a pump shaft extending longitudinally of the frame and operatively connected with said drive shaft, a pump operated by said pump shaft, hydraulic mechanism connected with said pump and comprising a cylinder and a reciprocating piston, a rack bar actuated by said piston, rocking means actuated by said rack bar and connected with said lifting means for actuating the same to raise and lower said lifting platform, and devices operable from the operator's platform to control the operation of said hydraulic mechanism to raise or lower the lifting platform, to hold the same at any elevation, and to reverse its movement at any stage thereof in either direction.

ROBERT J. BURROWS.